XXXXXXXXXX US010380333B1

(12) United States Patent
Moran et al.

(10) Patent No.: US 10,380,333 B1
(45) Date of Patent: Aug. 13, 2019

(54) MULTI-FACTOR AUTHENTICATION FOR DETERMINING WHETHER A USER IS AUTHORIZED TO TAKE AN EXAMINATION

(71) Applicant: Educational Testing Service, Princeton, NJ (US)

(72) Inventors: James B. Moran, Bordentown, NJ (US); Michael J. Cripps, Lincroft, NJ (US); Kenneth H. Berger, Rocky Hill, NJ (US); Robert E. Thornton, Hopewell, NJ (US)

(73) Assignee: Educational Testing Service, Princeton, NJ (US)

( * ) Notice: Subject to any disclaimer, the term of this patent is extended or adjusted under 35 U.S.C. 154(b) by 0 days.

(21) Appl. No.: 15/623,532

(22) Filed: Jun. 15, 2017

Related U.S. Application Data

(63) Continuation of application No. 14/831,144, filed on Aug. 20, 2015, now Pat. No. 9,721,080.

(60) Provisional application No. 62/039,651, filed on Aug. 20, 2014.

(51) Int. Cl.
*G06F 21/32* (2013.01)
*G06K 9/00* (2006.01)

(52) U.S. Cl.
CPC ......... *G06F 21/32* (2013.01); *G06K 9/00899* (2013.01); *G06K 9/00973* (2013.01); *G06K 9/00288* (2013.01)

(58) Field of Classification Search
CPC ..... G06F 21/32; G06F 21/44; G06K 9/00288; G09B 7/00; G09B 7/02; G09B 7/07
See application file for complete search history.

(56) References Cited

U.S. PATENT DOCUMENTS

| 8,584,219 | B1 | 11/2013 | Toole et al. | |
|---|---|---|---|---|
| 8,924,285 | B2* | 12/2014 | Rajakumar | G06F 21/32 705/38 |
| 8,925,058 | B1 | 12/2014 | Dotan et al. | |
| 2005/0095571 | A1 | 5/2005 | Miller | |
| 2007/0117083 | A1* | 5/2007 | Winneg | G09B 7/00 434/350 |
| 2008/0293033 | A1 | 11/2008 | Scicchitano et al. | |
| 2009/0116703 | A1 | 5/2009 | Schultz | |
| 2009/0119106 | A1* | 5/2009 | Rajakumar | G06F 21/32 704/246 |
| 2011/0207108 | A1 | 8/2011 | Dorman | |
| 2011/0223576 | A1 | 9/2011 | Foster et al. | |

(Continued)

*Primary Examiner* — Hee K Song
(74) *Attorney, Agent, or Firm* — Jones Day

(57) ABSTRACT

Systems and methods are provided for determining whether a user is authorized to take an examination. Facial recognition technology is used to determine whether an image of a user's face corresponds to an image of a set of images of individuals not permitted to take the examination. Based on a determination that the image of the user's face corresponds to an image of the set of images, a confidence score is assigned or modified. Voice recognition technology is used to determine whether a recording of the user's voice corresponds to a recording of a set of recordings of individuals not permitted to take the examination. Based on a determination that the recording of the user's voice corresponds to a recording of the set of recordings, the confidence score is modified. A determination is made as to whether the user is authorized to take the examination based on the confidence score.

20 Claims, 16 Drawing Sheets

(56) References Cited

U.S. PATENT DOCUMENTS

| | | | |
|---|---|---|---|
| 2012/0254243 A1* | 10/2012 | Zeppenfeld | H04M 15/47 707/778 |
| 2013/0167230 A1* | 6/2013 | Etchegoyen | G06F 21/57 726/22 |
| 2013/0176865 A1* | 7/2013 | Boland | H04L 47/2483 370/252 |
| 2013/0195316 A1* | 8/2013 | Bataller | G06K 9/00255 382/103 |
| 2014/0072946 A1 | 3/2014 | Scicchitano et al. | |
| 2015/0055763 A1* | 2/2015 | Guerra | G06Q 50/01 379/88.02 |

* cited by examiner

MULTI-FACTOR AUTHENTICATION FOR DETERMINING WHETHER A USER IS AUTHORIZED TO TAKE AN EXAMINATION

CROSS-REFERENCE TO RELATED APPLICATIONS

This application is a continuation application of U.S. patent application Ser. No. 14/831,144, filed Aug. 20, 2015, entitled "Systems and Methods for Multi-Factor Authentication for Administration of a Computer-Based Test," which claims priority to U.S. Provisional Patent Application No. 62/039,651, filed Aug. 20, 2014, entitled "Systems and Methods for Multi-Factor Authentication for Administration of a Remote Test Administration," both of which are incorporated herein by reference in their entireties.

FIELD

The technology described in this patent document relates generally to computer-based testing and more particularly to systems and methods for multi-factor authentication for administration of a computer-based test.

BACKGROUND

With the increasing use of standardized tests, particularly in primary and secondary education, it has become increasingly important to monitor the manner in which such tests are administered. For example, only persons who are properly registered to take an examination should be permitted to take the examination. The integrity of the examination is compromised if the examination can be taken by persons other than those that are properly registered. The examination should be administered and proctored properly to ensure that cheating does not take place. Additionally, test content should be secure from unauthorized access and alteration.

SUMMARY

The present disclosure is directed to a computer-implemented method, system, and non-transitory computer-readable storage medium for providing via a network a computer-based test to be taken at a computer, the computer being located in a testing center. In an example computer-implemented method of providing via a network a computer-based test to be taken at a computer, the computer being located in a testing center, a determination is made as to whether a geolocation of the computer is within an approved geolocation range. A determination is made as to whether a time at which the computer-based test is to be provided to the computer is within an approved time range. Based on a determination that either of the geolocation or the time is not within its respective range, the computer-based test is prevented from being provided to the computer. Based on a determination that the geolocation and the time are within the respective ranges, a hardware profile is compared to first data. The hardware profile comprises hardware configuration data for the computer and other computers located in the testing center, and the first data includes an expected hardware profile for the testing center. One of two actions is selectively performed based on the comparing of the hardware profile to the first data, the two actions comprising (i) preventing the computer-based test from being provided to the computer, and (ii) assigning or modifying a confidence score based on results of the comparison. The confidence score indicates a risk of fraud associated with the testing center and a test center administrator. Based on the confidence score being assigned or modified, biometric data of the test center administrator is compared to second data, and the confidence score is modified based on results of the comparison. Based on a determination that the confidence score meets or exceeds a threshold score, the computer-based test is provided to the computer over the network. Based on a determination that the confidence score is less than the threshold score, the computer-based test is prevented from being provided to the computer.

An example system for providing via a network a computer-based test to be taken at a computer includes a processing system and a computer-readable memory in communication with the processing system. The computer-readable memory is encoded with instructions for commanding the processing system to execute steps. In executing the steps, a determination is made as to whether a geolocation of the computer is within an approved geolocation range. A determination is made as to whether a time at which the computer-based test is to be provided to the computer is within an approved time range. Based on a determination that either of the geolocation or the time is not within its respective range, the computer-based test is prevented from being provided to the computer. Based on a determination that the geolocation and the time are within the respective ranges, a hardware profile is compared to first data. The hardware profile comprises hardware configuration data for the computer and other computers located in the testing center, and the first data includes an expected hardware profile for the testing center. One of two actions is selectively performed based on the comparing of the hardware profile to the first data, the two actions comprising (i) preventing the computer-based test from being provided to the computer, and (ii) assigning or modifying a confidence score based on results of the comparison. The confidence score indicates a risk of fraud associated with the testing center and a test center administrator. Based on the confidence score being assigned or modified, biometric data of the test center administrator is compared to second data, and the confidence score is modified based on results of the comparison. Based on a determination that the confidence score meets or exceeds a threshold score, the computer-based test is provided to the computer over the network. Based on a determination that the confidence score is less than the threshold score, the computer-based test is prevented from being provided to the computer.

In an example non-transitory computer-readable storage medium for providing via a network a computer-based test to be taken at a computer, the computer being located in a testing center, the computer-readable storage medium includes computer executable instructions which, when executed, cause a processing system to execute steps. In executing the steps, a determination is made as to whether a geolocation of the computer is within an approved geolocation range. A determination is made as to whether a time at which the computer-based test is to be provided to the computer is within an approved time range. Based on a determination that either of the geolocation or the time is not within its respective range, the computer-based test is prevented from being provided to the computer. Based on a determination that the geolocation and the time are within the respective ranges, a hardware profile is compared to first data. The hardware profile comprises hardware configuration data for the computer and other computers located in the testing center, and the first data includes an expected hardware profile for the testing center. One of two actions is selectively performed based on the comparing of the hardware profile to the first data, the two actions comprising (i) preventing the computer-based test from being provided to the computer, and (ii) assigning or modifying a confidence score based on results of the comparison. The confidence score indicates a risk of fraud associated with the testing center and a test center administrator. Based on the confidence score being assigned or modified, biometric data of the test center administrator is compared to second data, and the confidence score is modified based on results of the comparison. Based on a determination that the confidence score meets or exceeds a threshold score, the computer-based test is provided to the computer over the network. Based on a determination that the confidence score is less than the threshold score, the computer-based test is prevented from being provided to the computer.

In an example computer-implemented method for determining whether a user is authorized to take an examination, identification information provided by the user is received. Facial recognition technology is used to determine whether an image of the user's face corresponds to an image of a set of images of individuals not permitted to take the examination. Based on a determination that the image of the user's face corresponds to an image of the set of images, a confidence score is assigned or modified, the confidence score indicating a risk of fraud associated with the user. Based on a determination that the image of the user's face does not correspond to an image of the set of images, (i) facial recognition technology is used to determine whether the image of the user's face corresponds to a second image that is associated with the identification information, the second image having been captured during an examination registration, and (ii) the confidence score is modified based on the determination of whether the image of the user's face corresponds to the second image. Voice recognition technology is used to determine whether a recording of the user's voice corresponds to a recording of a set of recordings, the set of recordings including recordings of individuals not permitted to take the examination. Based on a determination that the recording of the user's voice corresponds to a recording of the set of recordings, the confidence score is modified. Based on a determination that the recording of the user's voice does not correspond to a recording of the set of recordings, (i) voice recognition technology is used to determine whether the recording of the user's voice corresponds to a second recording that is associated with the identification information, the second recording having been captured during the examination registration, and (ii) the confidence score is modified based on the determination of whether the recording of the user's voice corresponds to the second recording. Based on a determination that the confidence score meets or exceeds a threshold score, it is determined that the user is authorized to take the examination. Based on a determination that the confidence score is less than the threshold score, it is determined that the user is not authorized to take the examination.

An example system for determining whether a user is authorized to take an examination includes a processing system and a computer-readable memory in communication with the processing system. The computer-readable memory is encoded with instructions for commanding the processing system to execute steps. In executing the steps, identification information provided by the user is received. Facial recognition technology is used to determine whether an image of the user's face corresponds to an image of a set of images of individuals not permitted to take the examination. Based on a determination that the image of the user's face corresponds to an image of the set of images, a confidence score is assigned or modified, the confidence score indicating a risk of fraud associated with the user. Based on a determination that the image of the user's face does not correspond to an image of the set of images, (i) facial recognition technology is used to determine whether the image of the user's face corresponds to a second image that is associated with the identification information, the second image having been captured during an examination registration, and (ii) the confidence score is modified based on the determination of whether the image of the user's face corresponds to the second image. Voice recognition technology is used to determine whether a recording of the user's voice corresponds to a recording of a set of recordings, the set of recordings including recordings of individuals not permitted to take the examination. Based on a determination that the recording of the user's voice corresponds to a recording of the set of recordings, the confidence score is modified. Based on a determination that the recording of the user's voice does not correspond to a recording of the set of recordings, (i) voice recognition technology is used to determine whether the recording of the user's voice corresponds to a second recording that is associated with the identification information, the second recording having been captured during the examination registration, and (ii) the confidence score is modified based on the determination of whether the recording of the user's voice corresponds to the second recording. Based on a determination that the confidence score meets or exceeds a threshold score, it is determined that the user is authorized to take the examination. Based on a determination that the confidence score is less than the threshold score, it is determined that the user is not authorized to take the examination.

In an example non-transitory computer-readable storage medium for determining whether a user is authorized to take an examination, the computer-readable storage medium includes computer executable instructions which, when executed, cause a processing system to execute steps. In executing the steps, identification information provided by the user is received. Facial recognition technology is used to determine whether an image of the user's face corresponds to an image of a set of images of individuals not permitted to take the examination. Based on a determination that the image of the user's face corresponds to an image of the set of images, a confidence score is assigned or modified, the confidence score indicating a risk of fraud associated with the user. Based on a determination that the image of the user's face does not correspond to an image of the set of images, (i) facial recognition technology is used to determine whether the image of the user's face corresponds to a second image that is associated with the identification information, the second image having been captured during an examination registration, and (ii) the confidence score is modified based on the determination of whether the image of the user's face corresponds to the second image. Voice recognition technology is used to determine whether a recording of the user's voice corresponds to a recording of a set of recordings, the set of recordings including recordings of individuals not permitted to take the examination. Based on a determination that the recording of the user's voice corresponds to a recording of the set of recordings, the confidence score is modified. Based on a determination that the recording of the user's voice does not correspond to a recording of the set of recordings, (i) voice recognition technology is used to determine whether the recording of the user's voice corresponds to a second recording that is associated with the identification information, the second recording having been captured during the examination registration, and (ii) the confidence score is modified based on the determination of whether the recording of the user's voice corresponds to the second recording. Based on a determination that the confidence score meets or exceeds a threshold score, it is determined that the user is authorized to take the examination. Based on a determination that the confidence score is less than the threshold score, it is determined that the user is not authorized to take the examination.

DETAILED DESCRIPTION

Figure 1A:
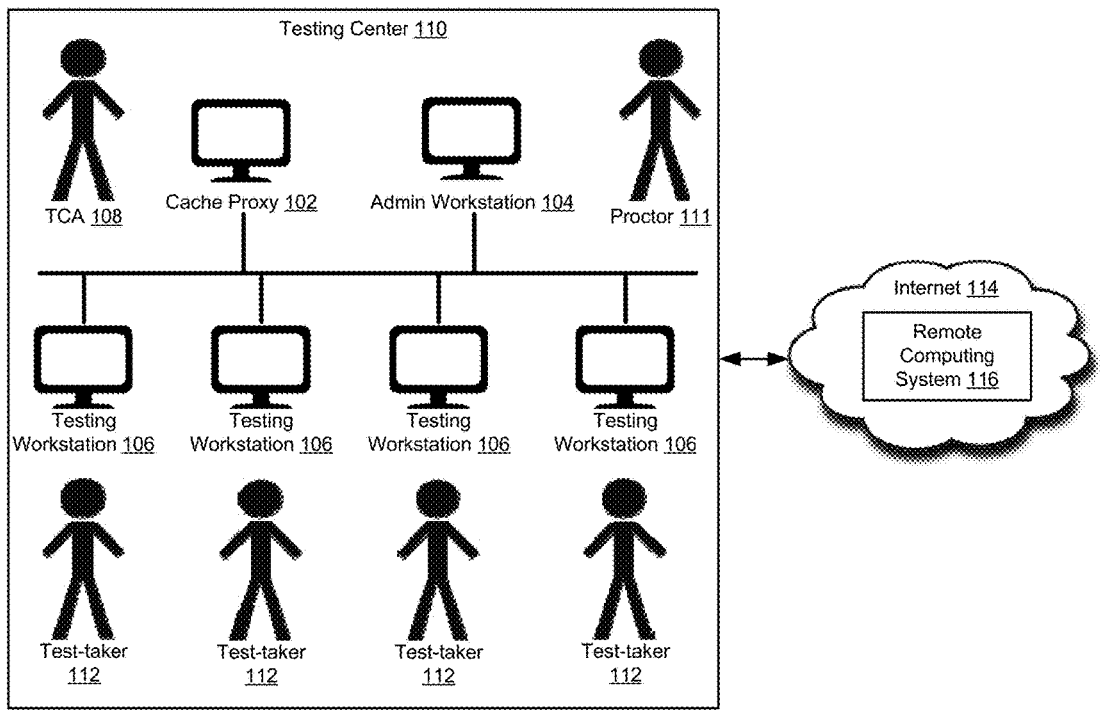
FIG. 1A is a block diagram of a testing center in communication with a remote computing system.

FIG. 1A is a block diagram of a testing center 110 in communication with a remote computing system 116. The testing center 110 includes a cache proxy computer 102, an administration workstation computer 104 (hereinafter, "admin workstation"), and a plurality of testing workstation computers 106. The cache proxy 102, admin workstation 104, and testing workstations 106 are connected via a network (e.g., a wireless network, a wired network, the Internet, etc.) and together facilitate the administration of computer-based examinations to test-takers 112. The cache proxy computer 102 executes cache proxy software (described in further detail below) that facilitates the administration of the computer-based examination. Likewise, the admin workstation 104 executes admin workstation software (described in further detail below), which is different than the cache proxy software and also facilitates the administration of the computer-based examination.

A test center administrator 108 (hereinafter "TCA") is responsible for the administration of the examination and controls the cache proxy 102 and admin workstation 104 computers. For example, when a test-taker 112 arrives at the testing center 110, the TCA 108 may check-in the test-taker 112 using the admin workstation 104. The check-in process and other duties of the TCA 108 are described in further detail below. One or more proctors 111 may work under the direction of the TCA 108 and assist in the administration of the examination. For example, after checking in a test-taker 112 using the admin workstation 104, the TCA 108 may instruct the proctor 111 to accompany the test-taker 112 to his or her assigned testing room and testing workstation 106. The proctor 111 may perform additional tasks such as monitoring the test-takers 112 as they work at the testing workstations 106 (e.g., to monitor for cheating, etc.) and responding to inquiries from the test-takers 112. The TCA 108 and proctors 111 are referred to herein as the "staff" of the testing center 110 (e.g., in contrast to the test-takers 112, who are clients or users of the testing center 110).

As noted above, administration of an examination may be facilitated by the cache proxy 102, admin workstation 104, and testing workstations 106. In an example, a launching of the cache proxy software on the cache proxy computer 102 enables a computer-based test to be downloaded from the remote computing system 116 to the cache proxy computer 102 (e.g., in encrypted form). In the example shown in FIG. 1A, the cache proxy computer 102 downloads the computer-based test from the remote computing system 116 via the Internet 114. The launching of the cache proxy software on the cache proxy computer 102 may further enable the cache proxy computer 102 to download other data needed to administer the test (e.g., a roster of registered test-takers, etc.). The remote computing system 116 may be maintained and operated by a testing service or examination provider (e.g., Educational Testing Service, etc.). The remote computing system 116 is denoted as being "remote" because it may not be located in proximity to the testing center 110. In examples, the remote computing system 116 is located in a different city, state, or country than the testing center 110.

After the computer-based examination has been downloaded from the remote computing system 116 to the cache proxy computer 102, the examination can be administered. Specifically, in an example, after arriving at the testing center 110, a test-taker 112 is checked-in using the admin workstation 104. As described in further detail below, the check-in procedure for the test-taker 112 may include capturing biometric data (e.g., photo biometric data, voice biometric data, fingerprint biometric data, etc.) of the test-taker 112 and comparing the captured biometric data to other data (e.g., expected biometric data for the test-taker 112, biometric data of "rogue galleries" containing data associated with individuals who are not authorized to take the examination, etc.) as a means of authenticating the test-taker 112. As a result of the check-in, the test-taker may be assigned to a specific testing room and testing workstation 106. The assigning is performed automatically by the cache proxy 102 or the admin workstation 104, in examples.

Following the assigning of the test-taker 112 to the testing room and testing workstation 106, a proctor 111 may accompany the test-taker 112 to his or her assigned room and workstation 106, and the proctor 111 may be required to enter proctor credentials (e.g., a username and password associated with the proctor 111) or otherwise authenticate himself in order to login to the testing workstation 106. The test-taker 112 may similarly be required to authenticate himself prior to accessing the testing workstation 106, in an example. After any authentication of the proctor 111 and/or test-taker 112 at the assigned testing workstation 106, the computer-based examination is downloaded from the cache proxy computer 102 to the testing workstation 106. The test-taker 112 uses the testing workstation 106 to answer questions of the examination and submit the answers for grading. The answers submitted by the test-taker 112 and other information related to the examination may be transmitted to the remote computing system 116. The remote computing system 116 may collect all test-related data (e.g., test-taker answers, etc.) and may further perform scoring and score reporting functions, among other functions.

In an example, the testing center 110 is a testing center that is not controlled by the testing service or examination provider that maintains the remote computing system 116. For example, the testing center 110 might not be owned and/or operated by the testing service or examination provider. The testing service or examination provider might have no way to directly "monitor" the administration of the test at the testing center 110. This may due to, among other reasons, the remoteness of the testing center 110 from the remote computing system 116 and/or the fact that a large number of examinations may be performed simultaneously at different locations around the world. In examples, the testing center 110 is an "impromptu" test center (i.e., not a "dedicated" testing center) and only operates as a testing center during certain times (e.g., weekends, etc.). Because the testing service or examination provider may not have control over the testing center 110, there is a need to ensure that there is an adequate level of security at the testing center 110. Such security may be used to ensure, among other things, that the examination is administered (i) at an intended geographic location, (ii) at an intended time, (iii) by intended staff members, and (iv) to intended test-takers. By providing this level of security at the testing center 110, the integrity of the examination and the testing process may be protected, thus enabling cost-effective, global, electronic delivery of examinations.

The systems and methods for multi-factor authentication for test administration, as described herein, may enable this level of security at the testing center 110. Rather than authenticating only a single factor (e.g., verifying a test-taker's identity), the systems and methods described herein instead seek to authenticate multiply factors. To illustrate this, reference is made to FIG. 1B, which depicts example steps of a method for multi-factor authentication for test administration. At 152, the testing center 110 is positively identified and authenticated. In an example, a verification check is performed to ensure that the testing center 110 is located at an approved location, is utilizing authorized and expected hardware and software, and is attempting to download and/or administer the computer-based examination at an intended (e.g., approved, predetermined) time or within an intended range of times.

In performing step 152, the verifying of the testing center 110 may include determining if the current information for the testing center 110 matches that collected during a certification procedure. In other examples, in performing step 152, the verifying of the testing center 110 may include determining if the current information for the testing center 110 matches that collected during a prior test administration or information from another source. For example, if a computer attempts to download the computer-based test from the remote computing system 116 and indicates that it is located in the previously-certified testing center 110, a geolocation (i.e., geographic location) of the computer may be compared to geolocation information captured during the certification of the testing center 110. If the geolocation information does not match, this may be evidence that a fraud is being perpetrated, and the computer-based test may be prevented from being downloaded to the computer. The geolocation of the computer may be determined from computer server IP address information (e.g., based on communication sequences for multiple computer servers involved in the communication). Similarly, if the computer attempts to download the computer-based test at a time that is outside of an allowed (e.g., approved, predetermined) range of times, as determined in the previous certification procedure, the computer-based test may prevented from being downloaded to the computer.

It is noted that the approaches described herein do not require the use of a testing center. For example, the systems and methods described herein may be used in the context of a home-based assessment (e.g., where a test-taker takes the examination at his or her home, dorm room, office, etc.) and in the context of an assessment that is proctored remotely (e.g., where the TCA and/or proctors are not physically present at the location at which the test-taker takes the examination), among others. Thus, it should be understood that the multi-factor authentication described herein may include authenticating a location at which an examination is to be taken, where the location may comprise a testing center or a different location.

At step 154, the TCA 108 and proctors 111 of the testing center 110 are positively identified and authenticated. In an example, a verification check is performed to ensure that the testing center 110 is staffed with known TCAs and proctors. For example, during a previous staff certification procedure, it may be determined that a staff member (i.e., a TCA or proctor) is authorized to participate in the administration of a computer-based examination. In the certification procedure, identification cards for the TCA 108 and the proctor(s) 111 (e.g., government issued identification) may be checked and verified (e.g., though scanning and remote processing of bar codes or other electronically or magnetically encoded data in the identification cards) and certain biometric information for the staff member may be collected, such as fingerprint biometric data, facial biometric data (e.g., photograph, etc.), and voice biometric data. In performing step 154, the authenticating of the TCA 108 and proctors 111 may include determining if the current information for the staff member matches that collected during the certification. Thus, for example, if a person purports to be a certified TCA, biometric data for the person may be compared to biometric data captured during the certification procedure. If the biometric data does not match, this may be evidence that a fraud is being perpetrated, and the computer-based test may be prevented from being downloaded to a computer of the testing center 110. In other examples, in performing step 154, the authenticating of the TCA 108 and proctors 111 may include determining if the current information for the staff member matches that collected during a prior test administration or information from another source.

At step 156, the test-takers 112 are positively identified and authenticated. In an example, checks are performed at various times to verify the identity of the test-taker 112. For example, during a registration procedure, it may be determined that an individual with government-issued identification is authorized to take a computer-based examination (e.g., the individual is not on a list of those known to have perpetrated a test-related fraud in the past). In the registration procedure, certain biometric data for the individual may be collected. In performing step 156, the verifying of the test-taker 112 may include determining if the current information for the test-taker 112 matches that collected during the registration. Thus, for example, if a person purports to be a registered test-taker, biometric data for the person may be compared to biometric data captured during the registration procedure. Additionally, at various points in the examination administration, biometric data for a test-taker may be compared to biometric data captured during an initial check-in procedure at the testing center 110. In these situations, if the biometric data does not match, this may be evidence that a fraud is being perpetrated. In examples, in performing step 156, the authenticating of the test-taker 112 may include determining if the current information for the test-taker 112 matches that collected during a prior test administration or information from another source.

Figure 1B:
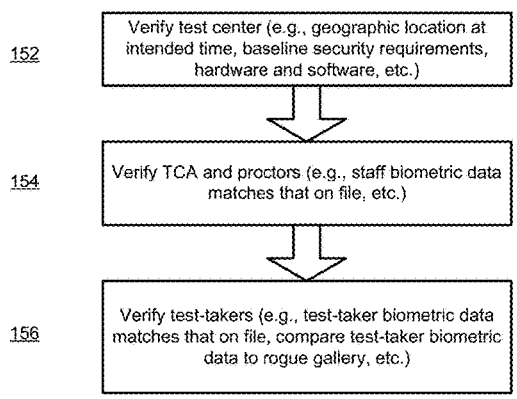
FIG. 1B is a flowchart depicting example steps of a method for multi-factor authentication for administration of a computer-based test.

Based on the foregoing description of FIGS. 1A and 1B, it should be appreciated that the systems and methods described herein facilitate a multi-factor authentication procedure for ensuring that a computer-based examination is (i) in the geographic location intended at the time intended, (ii) administered and proctored by appropriate individuals, and (iii) taken by persons whose identifications are verified and who are registered to take the examination. The systems and methods described herein may utilize a hybrid of biometric, geographic, and other identification and authentication methods, along with algorithmic evaluation of the validity of these identifiers and authentication credentials. Results and data generated via the systems and methods may be used to inform access control, investigation (e.g., fraud, cheating), and other decisions both automated and manual. Analysis can be performed in real-time, in batch (e.g., after-the-fact), or both. Steps of the multi-factor authentication procedure described herein may be performed locally (e.g., on one or more of the computers 102, 104, 106 located in the testing center 110), remotely (e.g., at the remote computing system 116 and on the basis of data transmitted from one or more of the testing center computers 102, 104, 106 to the remote computing system 116), or both.

The performing of the steps 152, 154, 156 may be used to make automated decisions related to the test administration. For example, based on determinations made in steps 152, 154, automated decisions may be made as to whether to permit the computer-based test to be downloaded from the remote computing system 116 to a computer (e.g., the cache proxy computer 102) of the testing center 110. As another example, based on determinations made in step 156, an automated decision may be made as to whether a user is authorized to take the examination. As described in further detail below, the automated decisions may be made on the basis of confidence scores, and various confidence scores may be utilized. For example, one confidence score may indicate a risk of fraud associated with a testing center and a TCA, and another confidence score may indicate a risk of fraud associated with a test-taker. A confidence score may be updated at various points during the test administration. For example, if a testing center (i.e., a facility or location attempting to function as a testing center) has a hardware profile that does not match an expected hardware profile for the testing center, a confidence score may be decreased. Conversely, if a TCA (i.e., an individual attempting to participate in the administration of a test as a TCA) generates biometric data that matches expected biometric data for the TCA, the confidence score may be increased. In an example, an automated decision is made on the basis of such confidence scores, such that a single factor (e.g., a failure of a hardware profile to match an expected profile) may not dictate the decision. The use of confidence scores is described in further detail below.

Figure 2A:
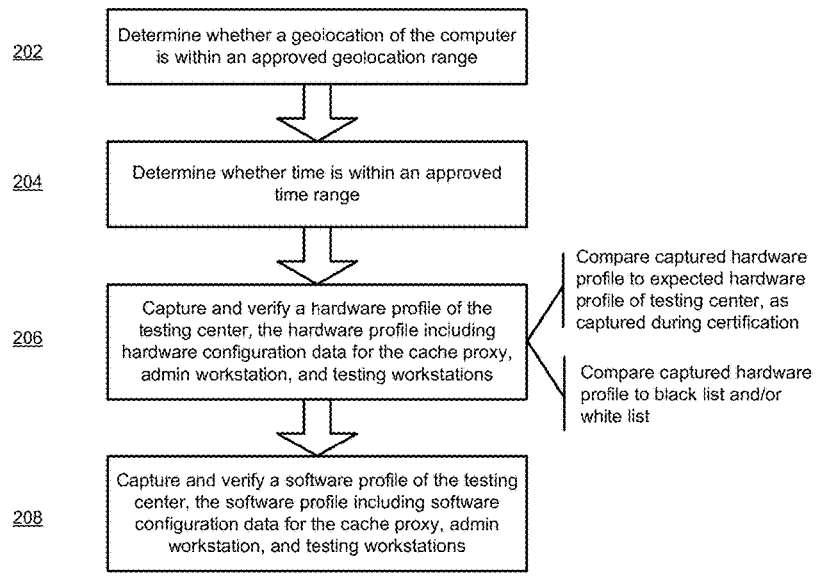
FIG. 2A is a flowchart depicting example steps of a method for verifying that a testing center is located where it should be, is stocked with acceptable hardware and software, and is seeking to receive a computer-based test when it should be.

FIG. 2A is a flowchart depicting example steps of a method for verifying that a testing center is located where it should be, is stocked with authorized hardware and software, and is attempting to download and/or administer a computer-based test when it should be. At 202, a determination is made as to whether a computer of the testing center has a geolocation (i.e., a geographical location) that is within a predetermined (e.g., approved) geolocation range. The computer may be, for example, the cache proxy computer to which the computer-based test may eventually be downloaded. The predetermined geolocation range may be determined as a result of a prior certification of the testing center. In an example, the geolocation of the computer may be determined from computer server IP address information (e.g., based on communication sequences for multiple computer servers involved in the communication). In other examples, the geolocation of the computer may be determined on the basis of a satellite positioning system, such as the global positioning system (GPS). In an example, the computer may comprise a GPS chip for determining the geolocation of the computer. The geolocation of the testing center may be determined and verified in other ways, in other examples. In performing the step 202, the verification of the geolocation of the testing center is not made on the basis of a location reported by a human (which may be fraudulent if the individual is purposefully misreporting the location) but is rather made on the basis of a computer-based geolocation determination. The use of the IP address information, GPS chip, or other computer-based technique for determining and reporting the location may help to ensure that the geolocation information is true and accurate.

At 204, a determination is made as to whether a time is within a predetermined (e.g., approved) time range. The time may be, for example, a time at which the computer-based test is to be downloaded to the testing center or another time associated with the administration of the computer-based test (e.g., a time at which the computer-based test is to be administered to a test-taker). The predetermined time range may be determined as a result of the prior certification of the testing center. The time may be determined on the basis of computer-determined time-stamping procedures known to those of ordinary skill in the art. Thus, the verification of the time is not made on the basis of a time reported by a human (which may be fraudulent if the individual is purposefully misreporting the time) but is rather made on the basis of a computer-based time determination. The use of the computer-based time determination for determining and reporting time may help to ensure that the time information used in the time verification is true and accurate.

If either of the geolocation and time verifications fails, this may be evidence that a fraud is being perpetrated. Consequently, appropriate action may be taken. For example, based on such a failure, the downloading of the computer-based test to a computer of the testing station may be prevented. In another example, a confidence score may be decreased in response to a geolocation or time failure. In other examples, a fraud alert may be generated and logged. Such fraud alerts may be transmitted to the test provider, in an example, which may log the fraud alerts and take appropriate action as necessary.

At 206, a hardware profile of the testing center is captured, with the hardware profile including hardware configuration data for the cache proxy, admin workstation, and testing workstations of the testing center. The hardware profile may also be known as a hardware "footprint" or "fingerprint" of the testing center. The hardware profile may include, but is not limited to, for each of the cache proxy, admin workstation, and testing workstations: geolocation, MAC address, IP address, processor type and speed, memory specifications, audio card information (e.g., manufacturer, etc.), and clock time. In an example, the hardware profile is not determined by a human (which may be fraudulent if the individual is purposefully misreporting the hardware profile) but is rather made on the basis of a computer-based determination. The use of the computer-based technique for determining and reporting the hardware profile may help to ensure that the hardware profile is true and accurate. Continuing at 206, after the capturing of the hardware profile, the captured profile can be verified. As illustrated in the figure, the verification may include comparing the captured hardware profile to an expected hardware profile, as captured during the certification of the testing center. If the captured hardware profile does not match the expected, approved hardware profile for the testing center, this may be evidence that a fraud is being perpetrated, and appropriate action may be taken (e.g., a confidence score may be decreased, a fraud alert may be generated and transmitted to the test provider, etc.). The verification may further include comparing the captured hardware profile to a "blacklist" of unauthorized hardware and/or a "whitelist" of authorized hardware. If the hardware profile (i) includes hardware on the blacklist, or (ii) includes hardware that is not on the whitelist, this may be evidence that a fraud is being perpetrated. Based on such evidence, appropriate action may be taken.

At 208, a software profile of the testing center is captured, with the software profile including software configuration data for the cache proxy computer, admin workstation, and testing workstations of the testing center. The software profile may also be known as a software "footprint" or "fingerprint" of the testing center. The software profile may include, but is not limited to, for each of the cache proxy computer, admin workstation, and testing workstations: drivers and versions thereof, operating system and version thereof, and/or applications and versions thereof, an "image" that captures an overall state of software on the computer. In an example, the software profile is not determined by a human (which may be fraudulent if the individual is purposefully misreporting the hardware software) but is rather made on the basis of a computer-based determination. The use of the computer-based technique for determining and reporting the software profile may help to ensure that the software profile is true and accurate. Continuing at 208, after the capturing of the software profile, the captured profile can be verified. As illustrated in the figure, the verification may include comparing the captured software profile to an expected software profile, as captured during the certification of the testing center. If the captured software profile does not match the expected, approved software profile for the testing center, this may be evidence that a fraud is being perpetrated, and appropriate action may be taken. The verification may further include comparing the captured software profile to a blacklist of unauthorized software and/or a whitelist of authorized software. If the software profile (i) includes software on the blacklist, or (ii) includes software that is not on the whitelist, this may be evidence that a fraud is being perpetrated. Based on such evidence, appropriate action may be taken.

Figure 2B:
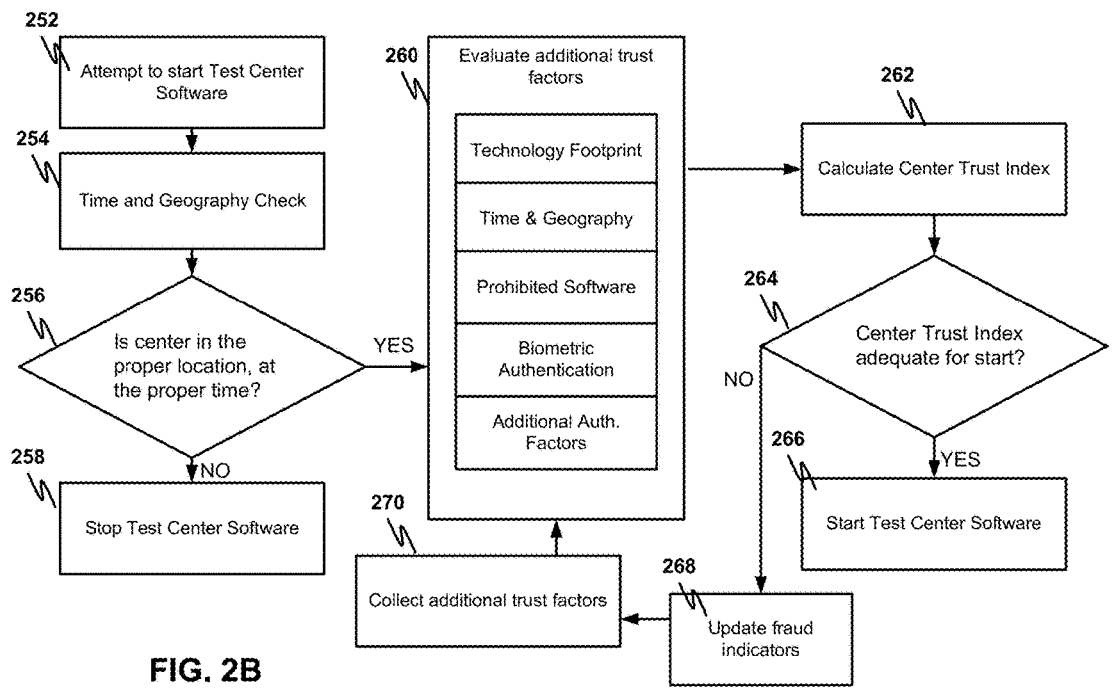
FIG. 2B is a flowchart depicting example steps for determining whether test center software should be launched.

FIG. 2B is a flowchart depicting example steps for determining whether test center software should be launched. The test center software may be cache proxy software executed on a cache proxy computer of a testing center, for example. As described above with reference to FIG. 1A, a launching of the cache proxy software may enable a computer-based test to be downloaded to the cache proxy computer. Thus, the flowchart of FIG. 2B may depict example steps for determining whether a computer-based test should be downloaded to a computer of a testing center. In other examples, the test center software is admin workstation software executed on the admin workstation computer. At 252, an attempt is made to start (i.e., launch) the test center software. At 254 and 256, time and geography checks are performed. These checks may be similar to those described above with reference to steps 202 and 204 of FIG. 2A and may involve determining if time and geolocation values are within respective ranges or limits. If it is determined at 256 that either of the geolocation or the time is not within its respective range, at 258, the test center software is not launched, or the test center software is stopped (i.e., killed).

If it is determined at 256 that both the geolocation and the time are within their respective ranges, at 260, one or more additional trust factors are evaluated. In this manner, the method of FIG. 2B implements a multi-factor authentication procedure. The additional trust factors evaluated at 260 may include (i) a technology footprint verification (e.g., comparing hardware and/or software profiles of the test center to expected profiles, blacklists, and whitelists, as described above with reference to steps 206, 208 of FIG. 2A), (ii) additional time and geography checks, (iii) a prohibited software check (e.g., using software blacklists or whitelists), (iv) biometric authentication of a TCA and/or proctors of the testing center (e.g., photograph, fingerprint, voice biometric, etc.), and (v) additional authentication factors.

At 262, based on the evaluation of one or more of the additional trust factors at 260, a center trust index is calculated. The center trust index may be an example of a confidence score and may indicate a risk of fraud associated with the testing center. To the extent that the center trust index is also based on the biometric authentication of the testing center's staff, the index may further indicate a risk of fraud associated with the staff (e.g., the TCA and/or proctors of the testing center). In an example, the center trust index is calculated based on results of the evaluations carried out at 260. For example, if the testing center staff is successfully authenticated, then the center trust index may be increased. Conversely, if the testing center staff cannot be authenticated, then the center trust index may be decreased.

In an example, fraud alerts may be generated at various points in the method of FIG. 2B. Fraud alerts may be generated, for example, based on: failure of computers of the testing center to pass technology footprint verification at startup or other times during test administration; failure of computers of the testing center to pass blacklist and/or whitelist requirements; failure of geolocation to map to an approved testing center; failure of all required testing workstations to be running and ready after the startup of the admin workstation; failure of a user to respond to a text-back pin; biometric failure of the TCA due to mismatch in photograph, voice, or fingerprint; biometric failure of the proctor due to mismatch in photograph, voice, or fingerprint; proctor attempt to launch the cache proxy (i.e., in an example, the proctor is not permitted to launch the cache proxy computer, and only the TCA is permitted to do so); proctor attempt to launch the admin workstation (i.e., in an example, the proctor is not permitted to launch the admin workstation, and only the TCA is permitted to do so); number of allowable failed login attempts exceeded by TCA; number of allowed failed login attempts exceeded by proctor; flag all significant activities at a high-risk testing center; flag all significant activities performed by a high-risk TCA; flag all significant activities performed by a high-risk proctor (e.g., in an example, testing centers, TCAs, and proctors may be identified as being "high risk"); flag any time anomalies such as starting a test outside the launch window or other test events occurring at unreasonable times; failure of the TCA to pass photo or voice biometric compared to photo and voice biometric captured at TCA certification or most recent update to photo and voice biometric; failure of the proctor to pass photo or voice biometric compared to photo and voice biometric captured at proctor certification or most recent update to photo and voice biometric; TCA attempting to administer a test for which they have not been authorized; proctor attempting to administer a test for which they have not been authorized (e.g., in examples, a TCA or proctor only has rights to work at a testing center to which he or she has been assigned and only has rights to administer testing programs to which he or she has been assigned); proctor attempting to make testing center attribute changes.

At 264, a determination is made as to whether the center trust index is high enough to permit the test center software to be started. The determination at 264 may include comparing the calculated center trust index to a threshold value. If the center trust index meets or exceeds the threshold value, then at 266, the test center software is started. If the center trust index is less than the threshold value, then at 268, fraud indicators are updated. The updating of the fraud indicators may include, for example, creating or updating a center problem report (CPR). The CPR is a report of any irregularities that occurred at the testing center. The CPR may be updated to indicate that certain of the trust factors evaluated at 260 were failures. At 270, additional trust factors are collected and subsequently evaluated at 260. The evaluation of the additional trust factors may cause the center trust index to be increased enough to permit the test center software to be started. Alternatively, if the center trust index is still below the threshold value after all available trust factors have been evaluated, then it may be determined that the test center software should not be started. It is noted that the method of FIG. 2B is an example only, and that other methods are employed in determining whether to launch test center software in other examples.

Figure 3A:
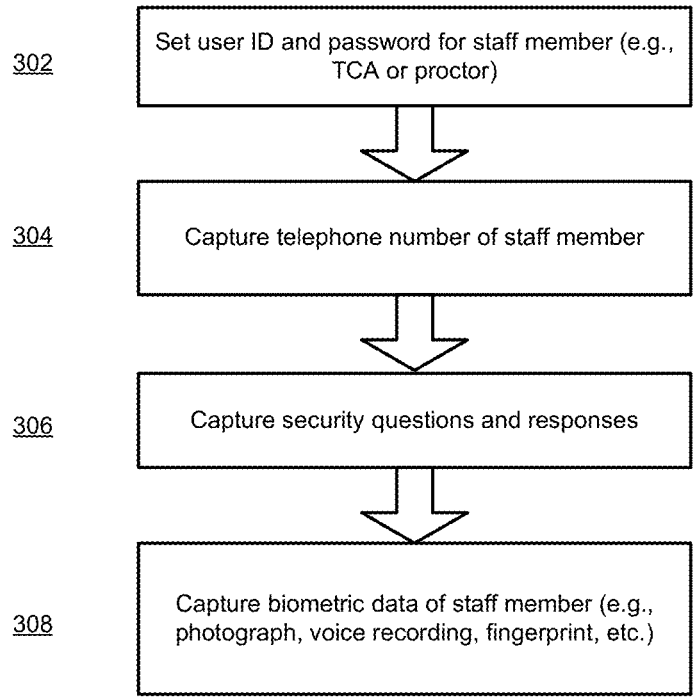
FIG. 3A depicts example steps for certification of a staff member (e.g., TCA or proctor) of a testing center.

FIG. 3A depicts example steps for certification of a staff member (e.g., TCA or proctor) of a testing center. As described herein, part of a multi-factor authentication procedure may include an authentication of a staff member. This authentication may include comparing information of the staff member (i.e., an individual attempting to act as a TCA or proctor at a testing center) with information collected during a previous certification procedure. If the staff member's information does not match information collected during the certification procedure, this may be evidence that the individual is not in fact authorized to participate in the administration of the examination. The example certification steps of FIG. 3A may facilitate this subsequent authentication of the staff member.

At 302, a user ID (e.g., a username) and password for the TCA or proctor are collected (e.g., set). The user ID and password may subsequently be used by the TCA or proctor to login to various computers of the testing center. It is noted that in accordance with the multi-factor authentication procedures described herein, additional identifying or authenticating information may be required in order for the staff member to login to the computers. In an example, the cache proxy computer and the admin workstation can be started by the TCA only. The proctor may use his user ID and password, for example, to login to testing workstations and thus allow test-takers to begin or resume examinations. Government-issued identification may also be scanned and verified as noted previously.

At 304, a telephone number (e.g., a cell phone number) of the staff member is captured. The telephone number may be verified using a text-back pin, in an example. For example, the staff member may provide his or her cell phone number, and a pin number may be transmitted (e.g., sent as a text message) to the provided cell phone number. In the certification procedure, the staff member to be certified must provide the pin number to prove that he or she is the owner of the provided cell phone number. At 306, security questions and responses may be captured for the staff member. At 308, biometric information for the staff member may be collected. Such information may include facial biometric data, voice biometric data, and/or fingerprint biometric data, among other data. The information collected at steps 306, 308 may be used in a subsequent authentication of the staff member, as described below.

Figure 3B:
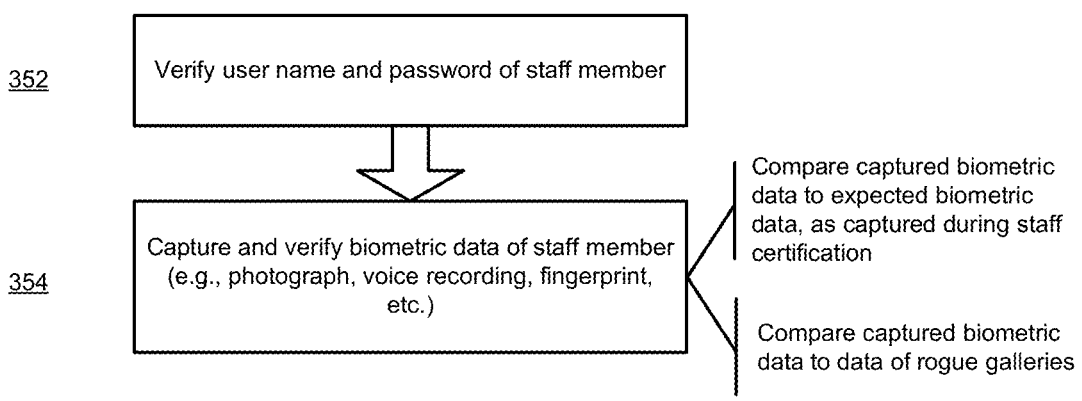
FIG. 3B depicts example steps for authenticating a staff member of a testing center.

FIG. 3B depicts example steps for authenticating a staff member of a testing center. Steps of the flowchart of FIG. 3B may be performed at various points in time. These points in time may include one or more of (i) when the staff member first arrives at the testing center (e.g., as part of sign-in or check-in procedure), (ii) when the cache proxy software is launched on the cache proxy computer, (iii) when the admin workstation software is launched on the admin workstation computer, (iv) at the launch of a computer-based examination, (v) when an attribute of the testing center is changed (e.g., a hardware or software profile of the testing center is to be updated), and (vi) prior to the staff member leaving the testing center (e.g., as part of a sign-out procedure).

At 352, the staff member's user ID and password are captured and verified. Thus, for example, logging into the cache proxy computer or admin workstation computer may require a TCA to input a combination of username and password that matches that set for the TCA during the certification procedure (e.g., as described above with reference to step 302 of FIG. 3A). At 354, biometric data for the staff member may be captured and verified. The biometric data may include facial recognition data, voice recognition data, and fingerprint data, among other types. The capturing of this biometric data may include, for example, taking a photograph of the staff member (e.g., using webcam of a computer, etc.) and capturing a speech sample (i.e., audio recording) of the staff member. The verifying of the captured biometric data, as performed at 354 of FIG. 3B, may include comparing the captured biometric data to expected biometric data for the staff member, where the expected biometric data was captured during the staff certification procedure (e.g., as described above with reference to FIG. 3A). If the staff member's biometric data does not match that captured during the certification procedure, this may be evidence that a fraud is being perpetrated and that the individual is not authorized to participate in the administration of the test. Thus, the verification procedure ensures that the individual attempting to participate in the test administration had previously undergone the required staff certification. The comparison of the biometric data to that captured during certification may utilize computer-based facial recognition technology and computer-based voice recognition technology, in examples.

The verifying of the captured biometric data, as performed at 354 of FIG. 3B, may further include comparing the captured biometric data to data of one or more "rogue galleries." A rogue gallery may include data (e.g., photographs, voice samples, fingerprints, etc.) of individuals known to have perpetrated fraud. If the staff member's biometric data matches data of a rogue gallery, this may be evidence that a fraud is being perpetrated and that the individual is not authorized to participate in the administration of the test. Computer-based facial recognition technology and voice recognition technology may be used to determine if the staff member's biometric data matches data of a rogue gallery. In an example, the rogue gallery may include large amounts of data (e.g., tens, hundreds, or thousands of photographs, voice samples, and other data), such that a manual comparison of the staff member's biometric data to data of the rogue gallery is impractical or impossible. In such examples, the use of the computer-based facial recognition technology and voice recognition technology may be used to perform the rogue gallery comparison in a relatively small amount of time.

As noted above, the authenticating of a staff member using one or more of the steps of FIG. 3B may be performed at various points in a test administration. In some of these authentication procedures, biometric data of a staff member may be verified in relation to data captured at an earlier point in the test administration. Thus, for example, when staff authentication is performed as part of a sign-out procedure (e.g., at an end of a test administration and/or before a staff member leaves the testing center), biometric data for the staff member may be verified against biometric data captured at a staff sign-in procedure. Failure of any staff authentication step (e.g., biometric data does not match data captured at certification, biometric data matches data of rogue gallery, etc.) may result in the generation of a fraud alert. Additionally, in examples where a confidence score is used in making an automated decision, failure of a staff authentication step may result in the confidence score being decreased, and a successful staff authentication step may result in the confidence score being increased.

Figure 3C:
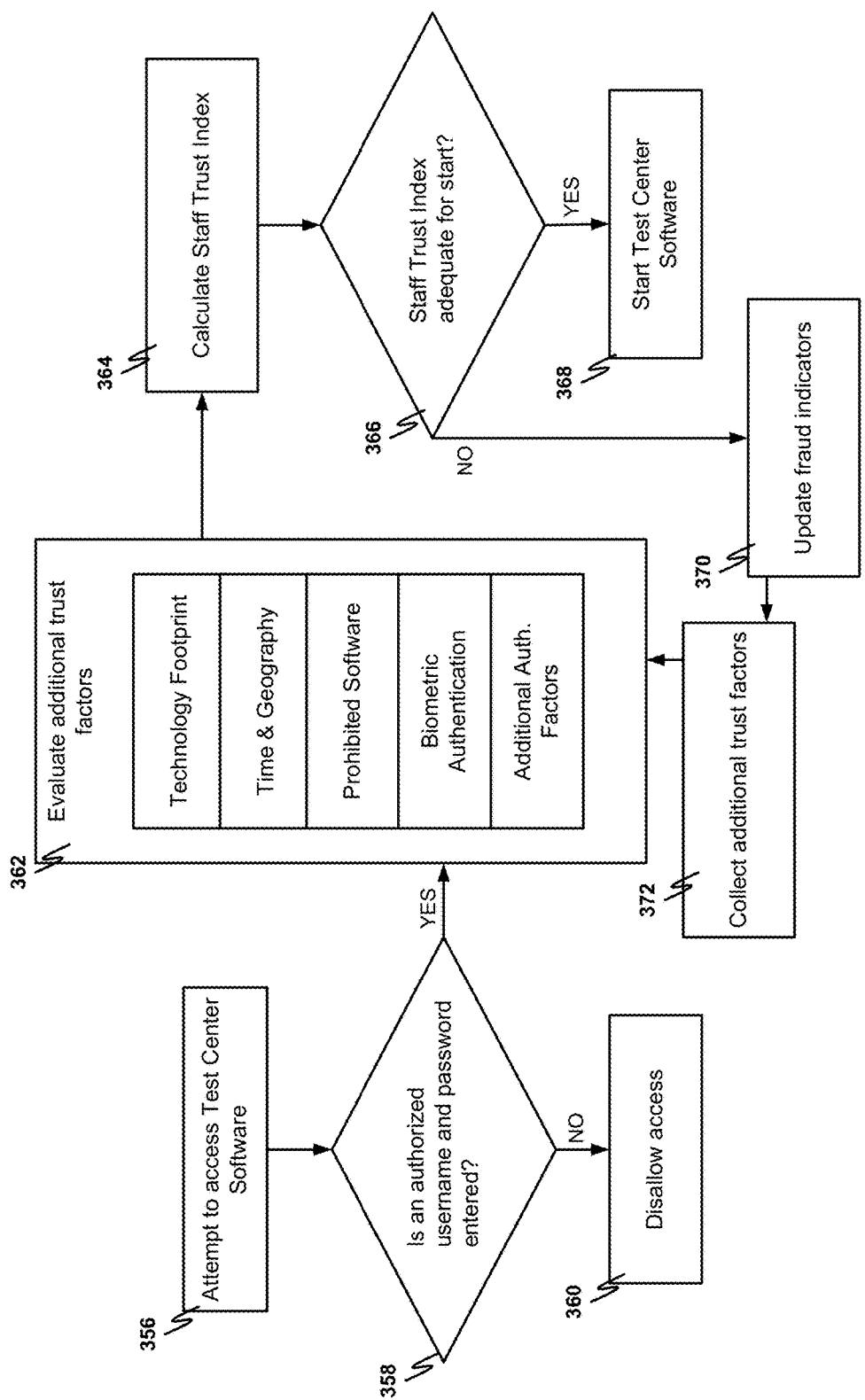
FIG. 3C is a flowchart depicting example steps for determining whether test center software should be launched.

FIG. 3C is a flowchart depicting example steps for determining whether test center software should be launched. The test center software may be cache proxy software executed on a cache proxy computer of a testing center or admin workstation software executed on an admin workstation computer of the testing center. In the example of FIG. 3C, the determination as to whether the test center software should be launched is based on, among other things, whether a staff member (e.g., a TCA or proctor) can be adequately authenticated. At 356, an attempt is made to start (i.e., launch) the test center software. The attempt to start the test center software may be made by the TCA or a proctor, for example. At 358, a determination is made as to whether an authorized username and password have been entered. If it is determined at 358 that an authorized username and password have not been entered, at 360, the test center software is not launched or access to the test center software is not allowed.

If it is determined at 358 that an authorized username and password have been entered, at 362, one or more additional trust factors are evaluated. In this manner, the method of FIG. 3C implements a multi-factor authentication procedure. The additional trust factors evaluated at 362 may include (i) a technology footprint verification (e.g., comparing hardware and/or software profiles of the test center to expected profiles, blacklists, and whitelists, as described above), (ii) time and geography checks (e.g., checks that are similar to those described above with reference to steps 202 and 204 of FIG. 2A and that involve determining if geolocation and time values are within respective, predetermined ranges or limits), (iii) a prohibited software check (e.g., using software blacklists or whitelists), (iv) biometric authentication of the TCA and/or proctors of the testing center, and (v) additional authentication factors.

At 364, based on the evaluation of one or more of the additional trust factors at 362, a staff trust index is calculated. The staff trust index may be an example of a confidence score and may indicate a risk of fraud associated with one or more staff members of the testing center. To the extent that the staff trust index is also based on aspects of the testing center (e.g., the testing center's hardware and/or software profiles, etc.), the staff trust index may further indicate a risk of fraud associated with the testing center. In an example, the staff trust index is calculated based on results of the evaluations carried out at 362. For example, if the testing center staff is successfully authenticated, then the staff trust index may be increased. Conversely, if the testing center staff cannot be authenticated, then the staff trust index may be decreased.

At 366, a determination is made as to whether the staff trust index is high enough to permit the test center software to be started. The determination at 366 may include comparing the calculated staff trust index to a threshold value. If the center trust index meets or exceeds the threshold value, then at 368, the test center software is started. If the staff trust index is less than the threshold value, then at 370, fraud indicators are updated. The updating of the fraud indicators may include, for example, creating or updating a CPR (e.g., the CPR may be updated to indicate that certain of the trust factors evaluated at 362 were failures). At 372, additional trust factors are collected and subsequently evaluated at 362. The evaluation of the additional trust factors may cause the staff trust index to be increased enough to permit the test center software to be started. Alternatively, if the staff trust index is still below the threshold value after all available trust factors have been evaluated, then it may be determined that the test center software should not be started. It is noted that the method of FIG. 3C is an example only, and that other methods are employed in determining whether to launch test center software in other examples.

Figure 4A:
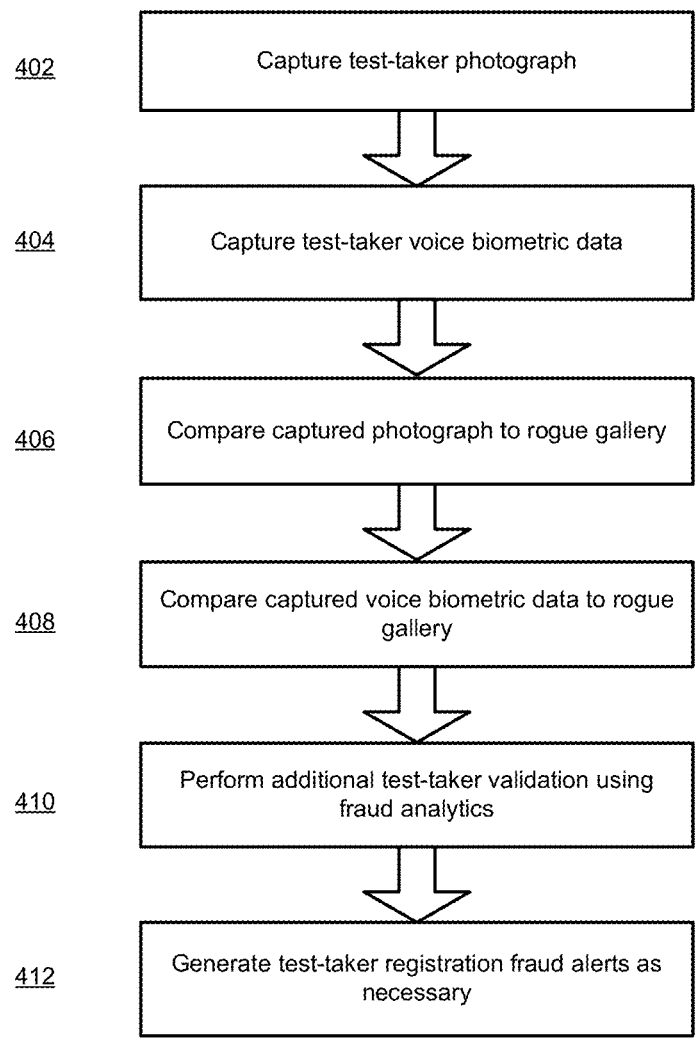
FIG. 4A depicts example steps for registration of a test-taker seeking to take an examination at a testing center.

FIG. 4A depicts example steps for registration of a test-taker seeking to take an examination at a testing center. As described herein, part of a multi-factor authentication procedure may involve an authentication of a test-taker. This authentication may include comparing information of a test-taker (e.g., an individual attempting to take an examination at the testing center) with information collected during a previous test-taker registration procedure. If the test-taker's information does not match information collected during the registration procedure, this may be evidence that the individual is not in fact authorized to take the examination. The example registration steps of FIG. 4A may facilitate this authentication of the test-taker.

At 402, a photograph of the test-taker is captured and stored. The capturing of the photograph may be accomplished via a variety of methods, such as using a web-cam of a computer and enabling the test-taker to upload a photograph via the Internet. At 404, voice biometric data for the test-taker is captured and stored. In an example, the voice biometric data comprises a recorded speech sample of the test-taker (e.g., of approximately 30 seconds in duration). To capture the speech sample, the test-taker may be asked to read a confidentiality statement associated with the examination. The capturing of the voice biometric data may be accomplished via a variety of methods, such as using a microphone on a computer and having the test-taker record their voice over the phone.

At 406, the captured photograph for the test-taker is compared to photographs of a rogue gallery, and at 408, the captured voice biometric data is compared to the voice biometric data of the rogue gallery. The rogue gallery may include data (e.g., photographs, voice samples, fingerprints, etc.) of individuals known to have perpetrated fraud. If the test-taker's captured biometric data matches data of the rogue gallery, this may be evidence that a fraud is being perpetrated and that the individual should not be permitted to take the examination (e.g., registration may be denied). Computer-based facial recognition technology and voice recognition technology may be used to determine if the test-taker's biometric data matches data of the rogue gallery.

At 410, additional test-taker validation may be performed using fraud analytics. Such fraud analytics may investigate various data of the test-taker (e.g., IP address of a computer used by the test-taker to register to take the examination, MAC address of the same computer, credit card information used to pay for the registration or other product, etc.). The investigation of such factors may result in the generation of a confidence score, and the confidence score may be used in determining whether the test-taker should be permitted to complete the registration. Test-taker registration fraud alerts may be generated, as necessary, at various points in the registration procedure, as illustrated at 412. Fraud alerts may be generated either in real-time, in batch mode (e.g., after-the-fact), or a combination of both. An alert level can be assigned to each individual fraud alert or assigned to a combination of all fraud risks identified, and an appropriate action may be taken based on an individual alert or combination of alerts. Fraud alerts may be activated or deactivated, and sensitivity levels may be set for controlling when alerts are generated. Fraud alerts may be generated, for example, based on a test-taker failing to provide a registration photograph or voice biometric; match of test-taker biometric data to data of rogue gallery; test-taker providing an address (e.g., a home address, billing address, etc.) that is greater than a predetermined distance from the testing center; a confidence score generated based on the aforementioned fraud analytics; multiple registration changes at a test center for a test within a specific time frame before the test day; test timing anomalies during the administration of a test (e.g., test start time outside of approved launch window, etc.) multiple test-takers with same security questions and responses; test-taker photograph captured at the testing center does not match the photograph provided at registration; test-taker voice print captured at the testing center does not match the voice print provided at registration; test-taker photograph taken when returning from a break does not match the photograph taken at check-in; test-taker photograph taken at random time during testing does not match the check-in photograph; test-taker's voice biometric captured during the test does not match the voice biometric captured during check-in; test-taker attempts to change their name; changes to multiple test-taker registrations at a testing center within a predetermined period of time before a test administration (e.g., identifiable by several test registrations being canceled and immediately replaced by new registrations occurring close to an admin date); test-taker speeding through the test; and test-taker taking an unscheduled break, among others.

Figure 4B:
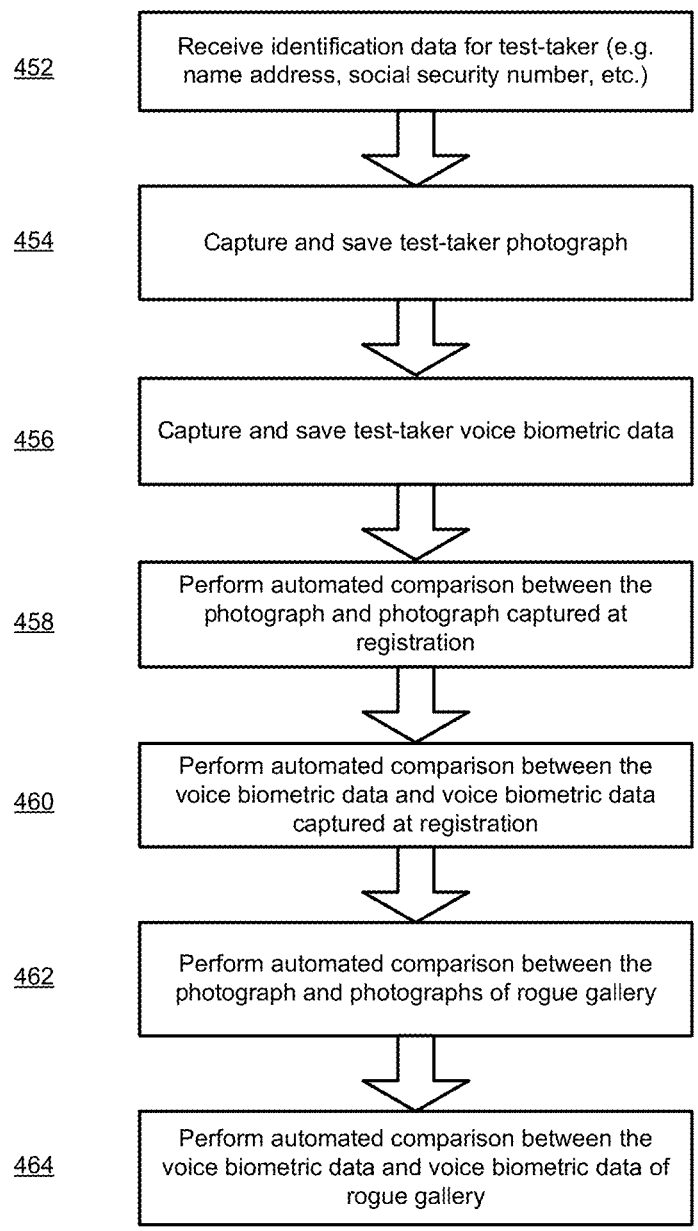
FIG. 4B depicts example steps for authenticating a test-taker at a testing center.

FIG. 4B depicts example steps for authenticating a test-taker at a testing center. Steps of the flowchart of FIG. 4B may be performed at various points in time. These points in time may include (i) when the test-taker first arrives at the testing center (e.g., as part of a sign-in or check-in procedure), (ii) when the test-taker first accesses a testing workstation, (iii) when reseating the test-taker at the testing workstation (e.g., after a break in the test or after a testing workstation hardware failure, etc.), and (iv) at random times during testing (e.g., the testing workstation may include camera and microphone components, thus enabling the capture and authentication of test-taker biometric data at random points during the examination), among others.

At 452, identification data for the test-taker is received. Such identification data may include a name, address, social security number, telephone number, and answers to security questions, among other data. At 454, a photograph of the test-taker's face is captured, and at 456, a recording of the test-taker's voice is captured. At 458, facial recognition technology is used to determine whether the photograph of the test-taker's face corresponds to a second photograph that is associated with the identification data, the second photograph having been captured during an examination registration. The facial recognition technology may implement an automated comparison between the test-taker's photograph and the second photograph captured during the examination registration. At 460, voice recognition technology is used to determine whether the recording of the test-taker's voice corresponds to a second recording that is associated with the identification data, the second recording having been captured during the examination registration. The voice recognition technology may implement an automated comparison between the test-taker's voice recording and the second recording captured during the examination registration. If the test-taker's biometric data (e.g., photograph or voice recording) does not match the biometric data captured during the examination registration, this may be evidence that a fraud is being perpetrated and that the individual is not authorized to take the examination. Thus, steps of the method of FIG. 4B may ensure that the individual attempting to take an examination had previously registered to take the examination.

At 462, the facial recognition technology is used to determine whether the photograph of the test-taker's face corresponds to an image of a set of images of individuals not permitted to take the examination (e.g., a rogue gallery). At 464, the voice recognition technology is used to determine whether a recording of the test-taker's voice corresponds to a recording of a set of recordings, the set of recordings including recordings of individuals not permitted to take the examination (e.g., a rogue gallery). If the staff member's biometric data matches data of a rogue gallery, this may be evidence that a fraud is being perpetrated and that the individual is not authorized to take the examination. The comparisons performed at 458, 460, 462, 464 may be used to determine whether the test-taker can be authenticated at the testing center and subsequently allowed to take the examination. Results of the comparisons may be used, for example, to update a confidence score for the test-taker, where the confidence score indicates a risk of fraud associated with the test-taker.

As noted above, the authenticating of a test-taker using one or more of the steps of FIG. 4B may be performed at various points in a test administration. In some of these authentication procedures, biometric data of the test-taker may be verified in relation to data captured at an earlier point in the test administration. Thus, for example, when test-taker authentication is performed as part of a reseating procedure (e.g., when the test-taker is reseated following a break in testing), biometric data for the test-taker may be verified against biometric data captured at a test-taker sign-in procedure. Failure of any test-taker authentication step (e.g., biometric data does not match data captured at registration, biometric data matches data of rogue gallery, etc.) may result in the generation of a fraud alert. Additionally, in examples where a confidence score is used in making an automated decision, failure of a test-taker authentication step may result in the confidence score being decreased, and a successful test-taker authentication step may result in the confidence score being increased.

Figure 4C:
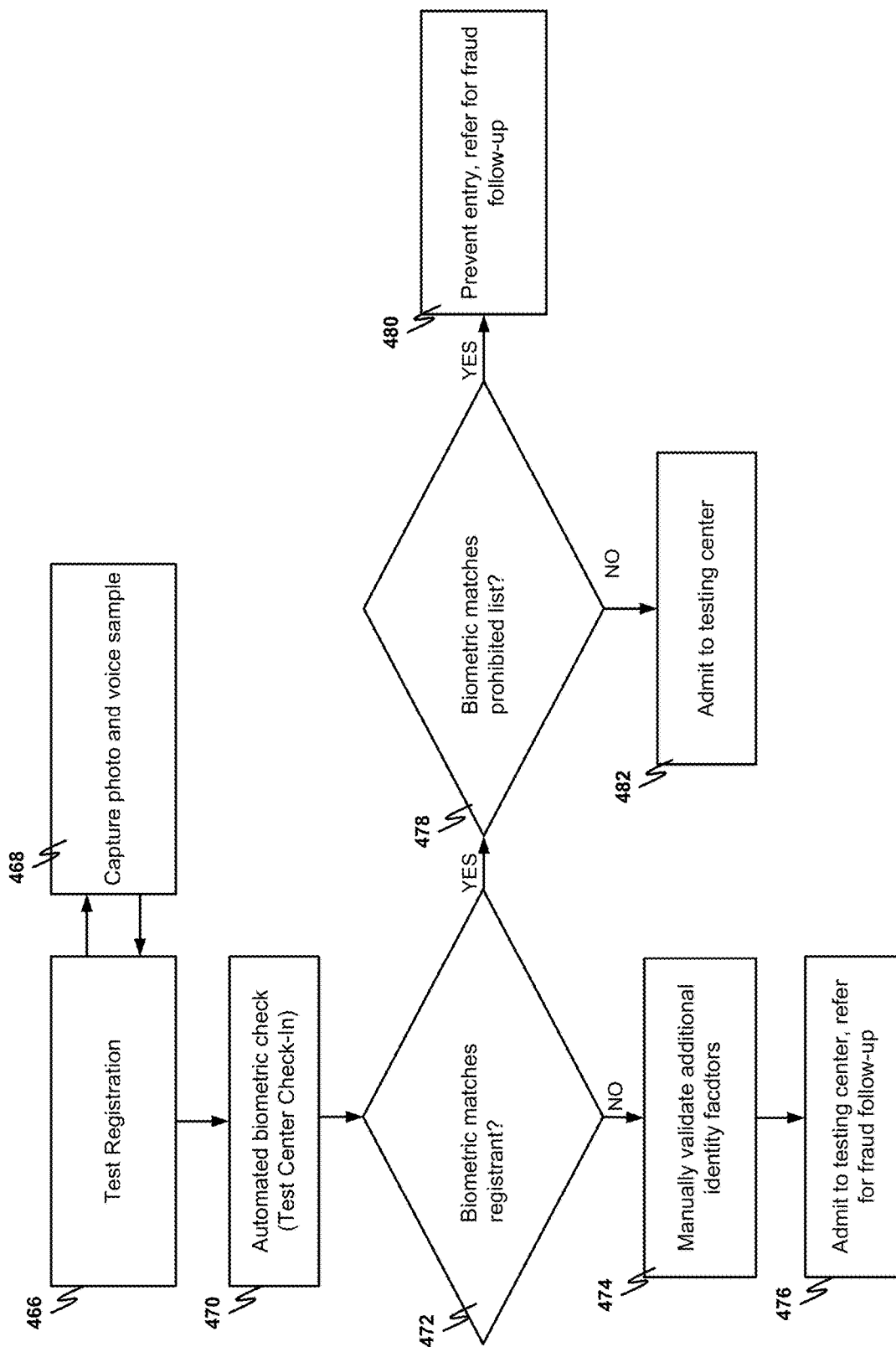
FIG. 4C is a flowchart depicting example steps for determining whether a test-taker should be admitted to a testing center.

FIG. 4C is a flowchart depicting example steps for determining whether a test-taker should be admitted to a testing center. At 466, a test registration procedure is performed. The test registration procedure may include, at 468, a capturing of a registrant's photograph, voice sample, and/or other biometric data. An example test registration procedure is described above with reference to FIG. 4A. At 470, an automated biometric check is performed as part of a testing center check-in procedure. The biometric check may include, at 472, a determination as to whether biometric data provided by a test-taker (i.e., an individual seeking to be admitted to the testing center to take a computer-based examination) matches biometric data captured during the previous test registration procedure. For example, if the test-taker indicates that his name is "John Doe," biometric data is collected for the test-taker and then compared to biometric data for a registrant "John Doe," as captured during the test registration procedure.

Based on a determination that the biometric data provided by the test-taker does not match biometric data captured during the previous test registration procedure, at 474, the test-taker may be manually validated using additional identity factors. Such additional identity factors may include, for example, answers to security questions and providing of documents (e.g., social security card, government-issued ID, etc.), among other factors. If the test-taker can be manually validated using the additional security factors, at 476, the test-taker may be admitted to the testing center. A fraud alert may be generated based on the determination that the biometric data provided by the test-taker did not match biometric data captured during the test registration procedure, and additional fraud investigation may be performed.

Based on a determination that the biometric data matches biometric data captured during the previous test registration procedure, at 478, a determination is made as to whether the test-taker's biometric data matches biometric data of a rogue gallery. If the test-taker's biometric data matches data of the rogue gallery, at 480, the test-taker is denied entrance to the testing center, and additional fraud investigation may be performed. If the test-taker's biometric data does not match data of the rogue gallery, at 482, the test-taker is admitted to the testing center.

Figure 5:
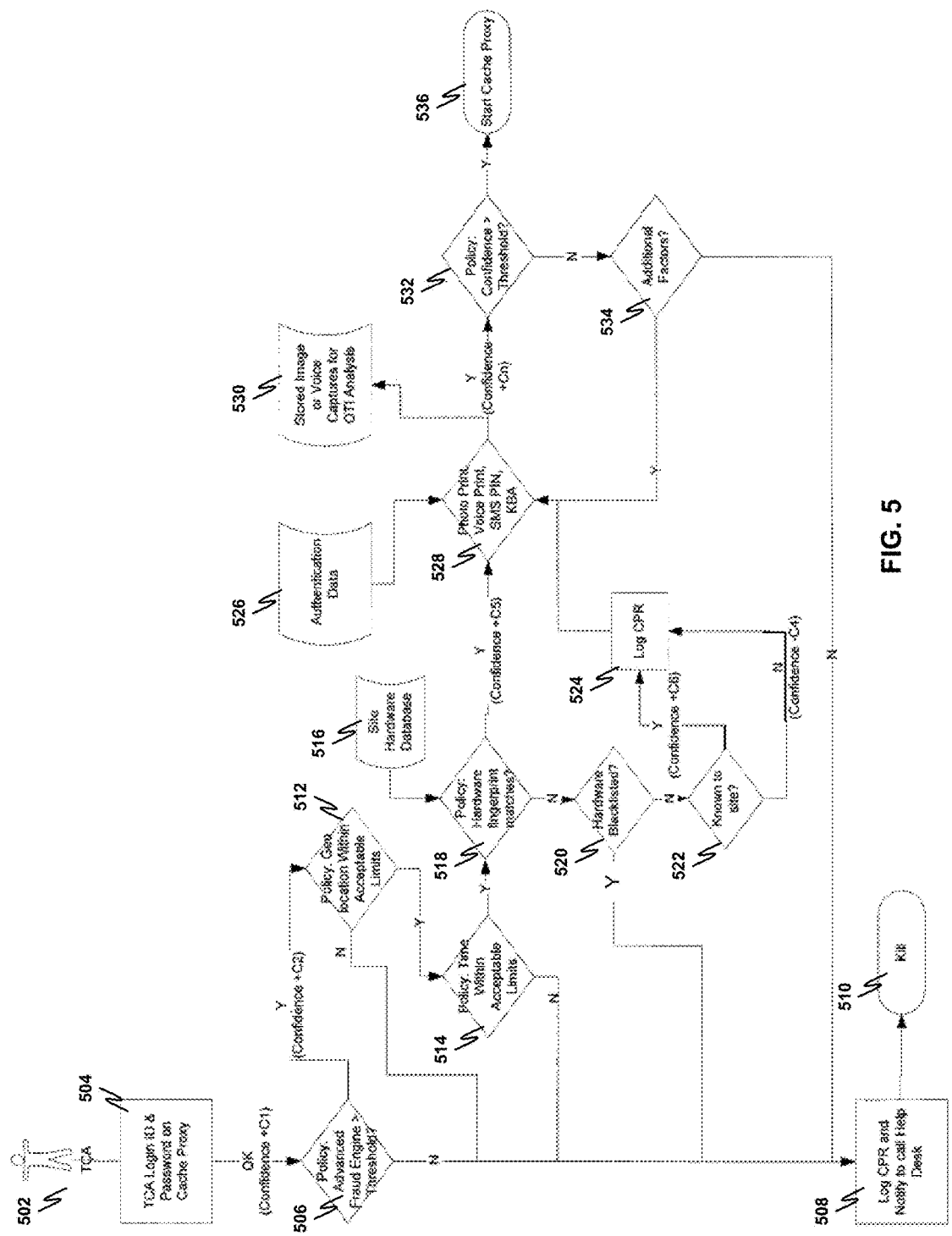
FIG. 5 is a flowchart depicting example steps for determining whether cache proxy software should be launched on a cache proxy computer of a testing center.

FIG. 5 is a flowchart depicting example steps for determining whether cache proxy software should be launched on a cache proxy computer of a testing center. As described above with reference to FIG. 1A, a launching of the cache proxy software may cause or enable a computer-based test to be downloaded to the cache proxy computer. Thus, the flowchart of FIG. 5 may depict example steps for determining whether a computer-based test should be downloaded to a computer of a testing center. At 504, a test center administrator (TCA) 502 provides his login ID and password. In examples, only the TCA is permitted to launch the cache proxy software (i.e., a proctor is not permitted to do so). If the combination of login ID and password matches that captured for the TCA 502 during a previous certification procedure, a confidence score is incremented (e.g., by an amount C1, as illustrated in the figure). At 506, a determination is made as to whether a fraud score provided by an advanced fraud detection engine meets or exceeds a threshold fraud score. The advanced fraud detection engine may consider a variety of factors relating to the TCA 502 (e.g., bank account number of the TCA 502, credit score of the TCA 502, credit card number of the TCA 502, etc.) in determining the fraud score. If the fraud score is less than the threshold fraud score, at 508, this result is logged in a center problem report (CPR). In an example, the CPR is a report of any irregularities that occurred at a test center during a test administration. Additionally, at 508, the TCA 502 may be asked to call a help desk (e.g., a help desk of the testing service or examination provider). Subsequently, at 510, launching of the cache proxy software is prevented, thus preventing the computer-based test from being downloaded to the testing center.

If the fraud score at 506 meets or exceeds the threshold fraud score, the confidence score is incremented (e.g., by an amount C2, as illustrated in the figure). Further, if the fraud score meets or exceeds the threshold fraud score, at 512, a determination is made as to whether a geolocation of the testing center or a computer therein (e.g., the cache proxy computer) is within acceptable limits. The acceptable limits may be defined via an approved, predetermined geolocation range. If the geolocation of the testing center or the computer therein is not within the acceptable limits, the method proceeds to 508. At 508, the geolocation determination is logged in the CPR, and the TCA 502 may be asked to call a help desk. Subsequently, at 510, launching of the cache proxy software is prevented. Conversely, if the geolocation of the testing center or the computer therein is within the acceptable limits, the method proceeds to 514. At 514, a determination is made as to whether a time is within acceptable limits. The acceptable limits may be defined via an approved, predetermined time range. If the time is not within the acceptable limits, the method proceeds to 508 and 510, and these steps are performed as described above. The time may be a "current time" (i.e., a time at which the TCA 502 attempts to start the cache proxy software. The time may further be indicative of a time at which the computer-based test is to be downloaded to the cache proxy computer or a time at which the computer-based test is to be administered.

If the time is determined at 514 to be within the acceptable limits, the method proceeds to 518. At 518, a determination is made as whether a hardware footprint (i.e., hardware profile or fingerprint) of the testing center matches an expected hardware footprint of the testing center. The expected hardware footprint of the testing center may be stored in a site hardware database 516 and may comprise data gathered during a certification of the testing center. If the hardware footprint does not match the expected hardware footprint, the method proceeds to 520. At 520, a determination is made as to whether the hardware footprint of the testing center includes unauthorized hardware. The determination may be made on the basis of a blacklist or a whitelist, as described above. If it is determined that the hardware footprint includes unauthorized hardware, the method proceeds to 508 and 510, and these steps are performed as described above. If it is determined that the hardware footprint does not include unauthorized hardware, the method proceeds to 522. At 522, a determination is made as to whether the hardware footprint includes hardware known to the testing site. If this determination is found to be true, the confidence score is incremented (e.g., by an amount C6, as illustrated in the figure), and if this determination is found to be false, the confidence score is decreased (e.g., by an amount C4, as illustrated in the figure). At 524, one or more of the results of the determinations made at 518, 520, and 522 are logged in the CPR. The method proceeds to step 528.

If it is determined at 518 that the hardware footprint matches the expected hardware footprint stored in the database 516, the confidence score is incremented (e.g., by an amount C5, as illustrated in the figure), and the method proceeds to step 528. At 528, a determination is made as to whether biometric data of the TCA 502 matches expected biometric data for the TCA 502. The biometric data considered may include, for example, facial recognition data, voice recognition data, and fingerprint data, among other data. The authentication at 528 may further require the TCA 502 to provide a pin number received via a text message (e.g., a text-back pin), as described above. Data used in the authentication of step 528 (e.g., expected biometric data for the TCA, etc.) may be stored in an authentication data database 526 and may comprise data gathered during a certification procedure (e.g., a certification procedure by which the TCA 502 is authorized to participate in the administration of a computer-based examination). At 530, the biometric data gathered for the TCA 502 may be stored for subsequent Office of Testing Integrity (OTI) analysis.

If the biometric data of the TCA 502 matches the expected biometric data, the confidence score is incremented. At 532, a determination is made as to whether the confidence score meets or exceeds a threshold confidence score. If the confidence score meets or exceeds the threshold confidence score, the method proceeds to 536, and the cache proxy software is launched on the cache proxy computer. As described above, the launching of the cache proxy software may enable the computer-based test to be downloaded to the cache proxy computer of the testing center. If the confidence score is less than the threshold confidence score, at 534, a determination is made as to whether additional factors (e.g., additional biometric factors, additional security factors, etc.) can be evaluated. If additional factors are available for evaluation, the method proceeds to 528, where such additional factors are evaluated. If additional factors are not available for evaluation, the method proceeds to 508 and 510, and these steps are performed as described above.

Figure 6:
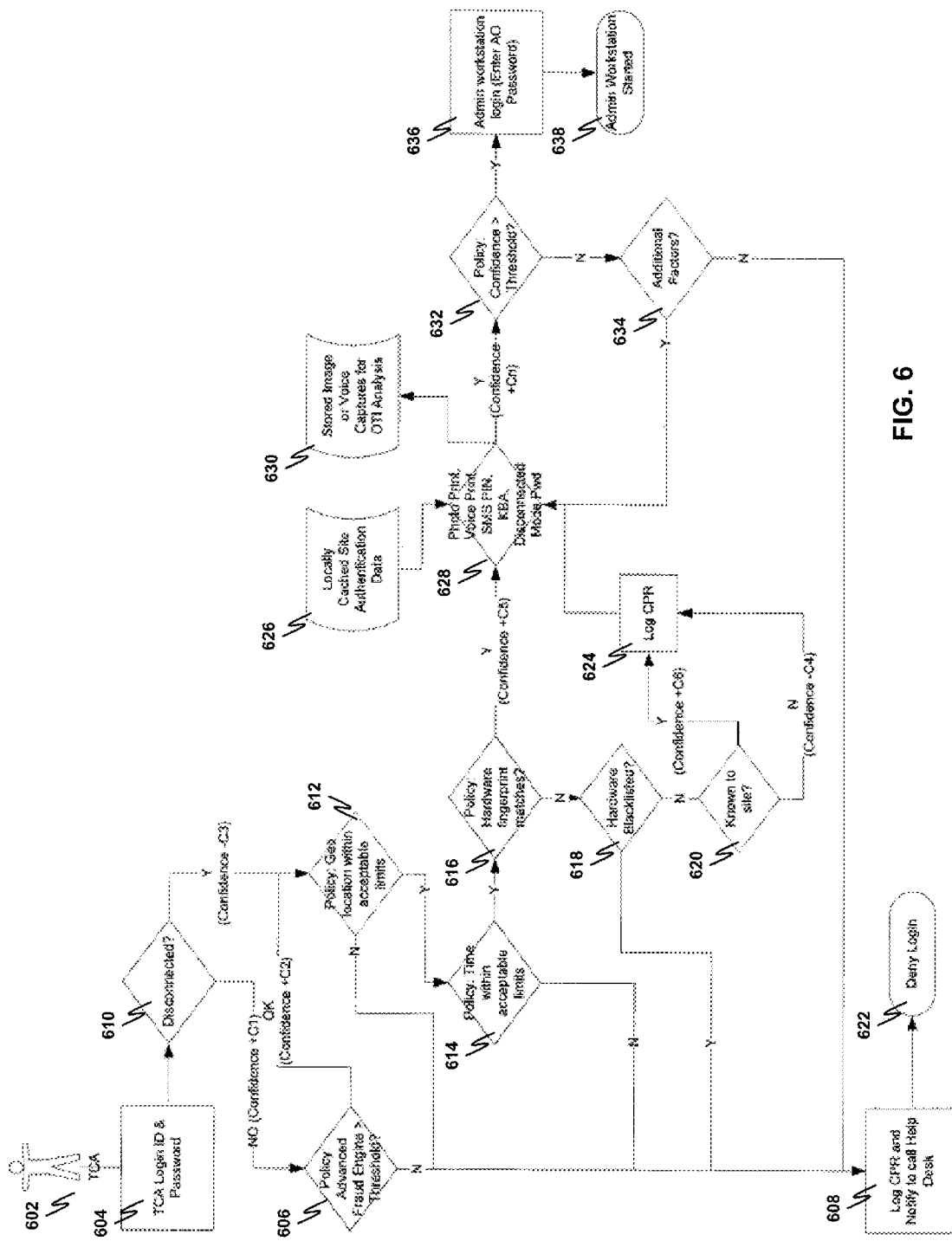
FIG. 6 is a flowchart depicting example steps for determining whether admin workstation software should be launched on an admin workstation of a testing center.

FIG. 6 is a flowchart depicting example steps for determining whether admin workstation software should be launched on an admin workstation of a testing center. As described above with reference to FIG. 1A, a launching of the admin workstation software may enable test-takers to be checked-in to the testing center, among other functions. At 604, a TCA 602 provides his login ID and password. In examples, only the TCA is permitted to launch the admin workstation software (i.e., a proctor is not permitted to do so). At 610, a determination is made as to whether the admin workstation is in a disconnected mode. As referred to herein, a "disconnected mode" is a method of delivering a computer-based examination while the testing center is not connected to the testing service or examination provider during delivery of the examination to the test-taker. The testing center may become disconnected from the testing service or test provider due to network issues (e.g., the testing center loses its Internet connection), for example. In general, security protocols and requirements demanded in connected mode are enforced for testing centers running in disconnected mode. If the admin workstation is in the disconnected mode, a confidence score is decreased (e.g., by an amount C3, as illustrated in the figure), and the method proceeds to 612. If the admin workstation is not in the disconnected mode, the confidence score is increased (e.g., by an amount C1), and the method proceeds to 606.

At 606, a determination is made as to whether a fraud score provided by an advanced fraud detection engine meets or exceeds a threshold fraud score. The advanced fraud detection engine may consider a variety of factors relating to the TCA 602 in determining the fraud score, as described above with reference to FIG. 5. If the fraud score is less than the threshold fraud score, at 608, this result is logged in the CPR. Additionally, at 608, the TCA 602 may be asked to call a help desk. Subsequently, at 622, launching of the admin workstation software is prevented.

If the fraud score at 606 meets or exceeds the threshold fraud score, the confidence score is incremented (e.g., by an amount C2, as illustrated in the figure). Further, if the fraud score meets or exceeds the threshold fraud score, at 612, a determination is made as to whether a geolocation of the testing center or a computer therein (e.g., the cache proxy computer or the admin workstation computer) is within acceptable limits. The acceptable limits may be defined via a predetermined geolocation range. If the geolocation of the testing center or the computer therein is not within the acceptable limits, the method proceeds to 608. At 608, this geolocation determination is logged in the CPR, and the TCA 602 may be asked to call a help desk. Subsequently, at 622, launching of the admin workstation software is prevented. Conversely, if the geolocation of the testing center or the computer therein is within the acceptable limits, the method proceeds to 614. At 614, a determination is made as to whether a time is within acceptable limits. The acceptable limits may be defined via a predetermined time range. If the time is not within the acceptable limits, the method proceeds to 608 and 622, and these steps are performed as described above.

If the time is determined at 614 to be within the acceptable limits, the method proceeds to 616. At 616, a determination is made as whether a hardware footprint of the testing center matches an expected hardware footprint of the testing center. The expected hardware footprint of the testing center may comprise data gathered during a certification of the testing center. If the hardware footprint does not match the expected hardware footprint, the method proceeds to 618. At 618, a determination is made as to whether the hardware footprint of the testing center includes unauthorized hardware. The determination may be made on the basis of a blacklist or a whitelist, as described above. If it is determined that the hardware footprint includes unauthorized hardware, the method proceeds to 608 and 622, and these steps are performed as described above. If it is determined that the hardware footprint does not include unauthorized hardware, the method proceeds to 620. At 620, a determination is made as to whether the hardware footprint includes hardware known to the testing site. If this determination is found to be true, the confidence score is incremented (e.g., by an amount C6, as illustrated in the figure), and if this determination is found to be false, the confidence score is decreased (e.g., by an amount C4, as illustrated in the figure). At 624, one or more of the results of the determinations made at 616, 618, and 620 are logged in the CPR. The method proceeds to step 628.

If it is determined at 616 that the hardware footprint matches the expected hardware footprint, the confidence score is incremented (e.g., by an amount C5, as illustrated in the figure), and the method proceeds to step 628. At 628, a determination is made as to whether biometric data of the TCA 602 matches expected biometric data for the TCA 602. The biometric data considered may include, for example, facial recognition data, voice recognition data, and fingerprint data, among other data. The authentication at 628 may further require the TCA 602 to provide a pin number received via a text message (e.g., a text-back pin) and/or a disconnected mode password. Data used in the authentication of step 628 (e.g., expected biometric data for the TCA, etc.) may be stored in an authentication data database 626 and may comprise data gathered during a certification procedure (e.g., a certification procedure by which the TCA 602 is authorized to participate in the administration of a computer-based examination). At 630, the biometric data gathered for the TCA 602 may be stored for subsequent Office of Testing Integrity (OTI) analysis.

If the biometric data of the TCA 602 matches the expected biometric data, the confidence score is incremented. At 632, a determination is made as to whether the confidence score meets or exceeds a threshold confidence score. If the confidence score meets or exceeds the threshold confidence score, the method proceeds to 636, where the TCA 602 is permitted to login to the admin workstation (e.g., using a previously-defined username and password). At 638, the admin workstation software is launched on the admin workstation computer. If the confidence score is less than the threshold confidence score, at 634, a determination is made as to whether additional factors (e.g., additional biometric factors, additional security factors, etc.) can be evaluated. If additional factors are available for evaluation, the method proceeds to 628, where such additional factors are evaluated. If additional factors are not available for evaluation, the method proceeds to 608 and 622, and these steps are performed as described above.

Figure 7:
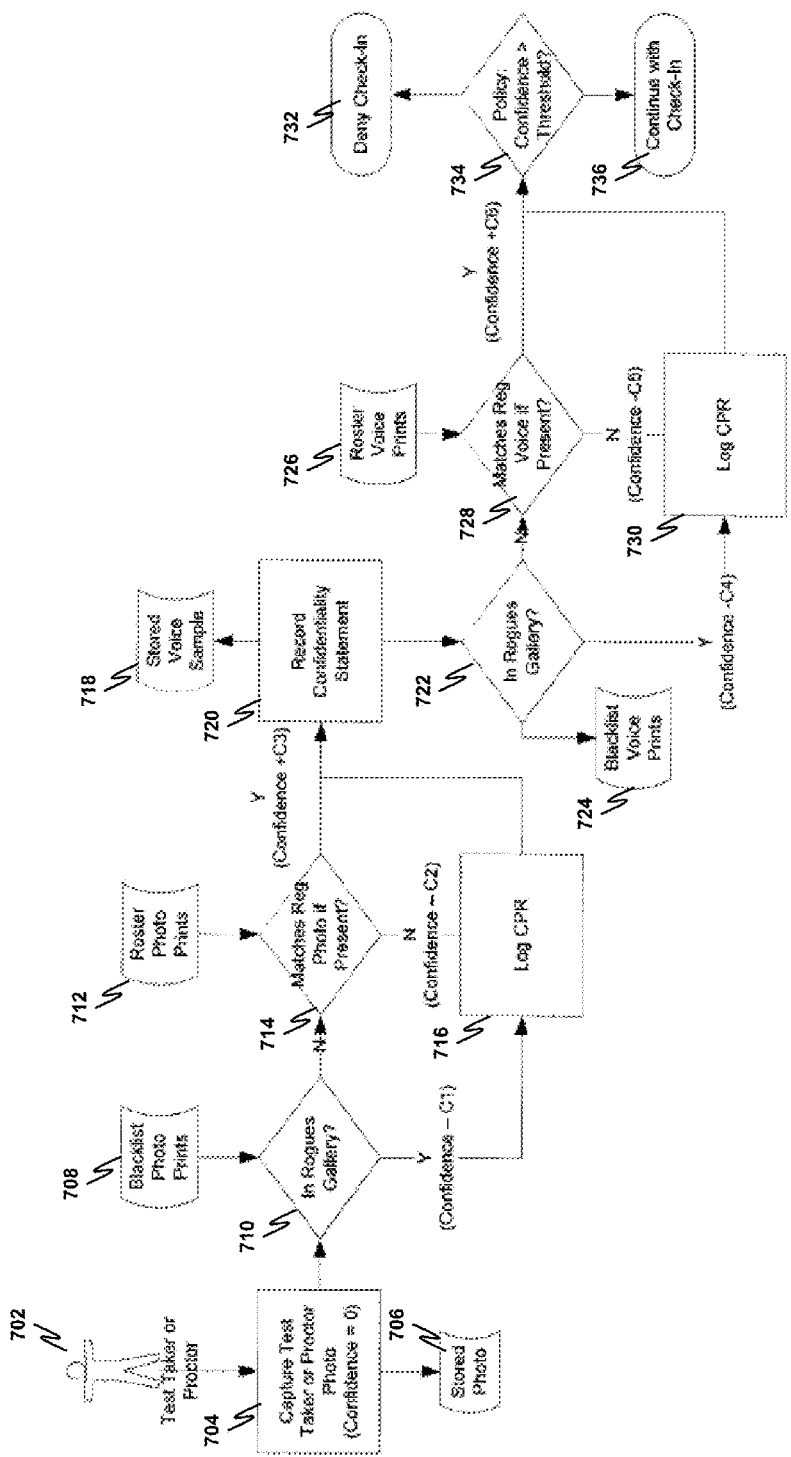
FIG. 7 is a flowchart depicting example steps for checking in a test-taker or proctor at a testing center.

FIG. 7 is a flowchart depicting example steps for checking in a user 702 (e.g., a test-taker or proctor) at a testing center. At 704, a photograph of the user is captured and stored at 706. At this point in the method, a confidence score may be equal to zero, with the confidence score indicating a risk of fraud associated with the user 702. At 710, a determination is made as to whether the user's photograph corresponds to a photograph included in a rogue gallery. The rogue gallery may include photographs 708 of individuals not permitted to participate in the examination. If the user's photograph corresponds to a photograph included in the rogue gallery, the confidence score is decreased (e.g., by an amount C1, as illustrated in the figure), and at 716, this result is logged in the CPR. If the user's photograph does not correspond to a photograph included in the rogue gallery, the method proceeds to 714.

At 714, a determination is made as to whether the user's photograph corresponds to a registration photograph. For example, if the user 702 provides certain identification information upon arrival at the testing center (e.g., a name or social security number), a determination is made as to whether the user's photograph corresponds to a second image that is associated with the identification information, the second image having been captured during an examination registration or certification procedure. Such photographs may be stored in a database or datastore 712. If the user's photograph does not correspond to a photograph stored in the database 712, the confidence score is decreased (e.g., by an amount C2, as illustrated in the figure), and at 716, this result is logged in the CPR. If the user's photograph corresponds to a photograph stored in the database 712, the confidence score is increased (e.g., by an amount C3, as illustrated in the figure), and the method proceeds to 720.

At 720, a speech sample of the user 702 is captured and stored at 718. To capture the speech sample, the user 702 may be asked to read a confidentiality statement associated with the examination. At 722, a determination is made as to whether the user's speech sample corresponds to a speech sample included in a rogue gallery. The rogue gallery may include speech samples 724 of individuals not permitted to participate in the examination. If the user's speech sample corresponds to a speech sample included in the rogue gallery, the confidence score is decreased (e.g., by an amount C4, as illustrated in the figure), and at 730, this result is logged in the CPR. If the user's speech sample does not correspond to a speech sample included in the rogue gallery, the method proceeds to 728.

At 728, a determination is made as to whether the user's speech sample corresponds to a registration speech sample. For example, if the user 702 provides certain identification information upon arrival at the testing center, a determination is made as to whether the user's speech sample corresponds to a second speech sample that is associated with the identification information, the second speech sample having been captured during an examination registration or certification procedure. Such speech samples may be stored in a database or datastore 726. If the user's speech sample does not correspond to a speech sample stored in the database 726, the confidence score is decreased (e.g., by an amount C5, as illustrated in the figure), and at 730, this result is logged in the CPR. If the user's speech sample corresponds to a speech sample stored in the data base 726, the confidence score is increased (e.g., by an amount C6, as illustrated in the figure), and the method proceeds to 734. At 734, a determination is made as to whether the confidence score meets or exceeds a threshold confidence score. If the confidence score is less than the threshold confidence score, check-in of the user 702 is denied at 734. If the confidence score meets or exceeds the threshold confidence score, check-in of the user 702 continues at 736.

Figure 8:
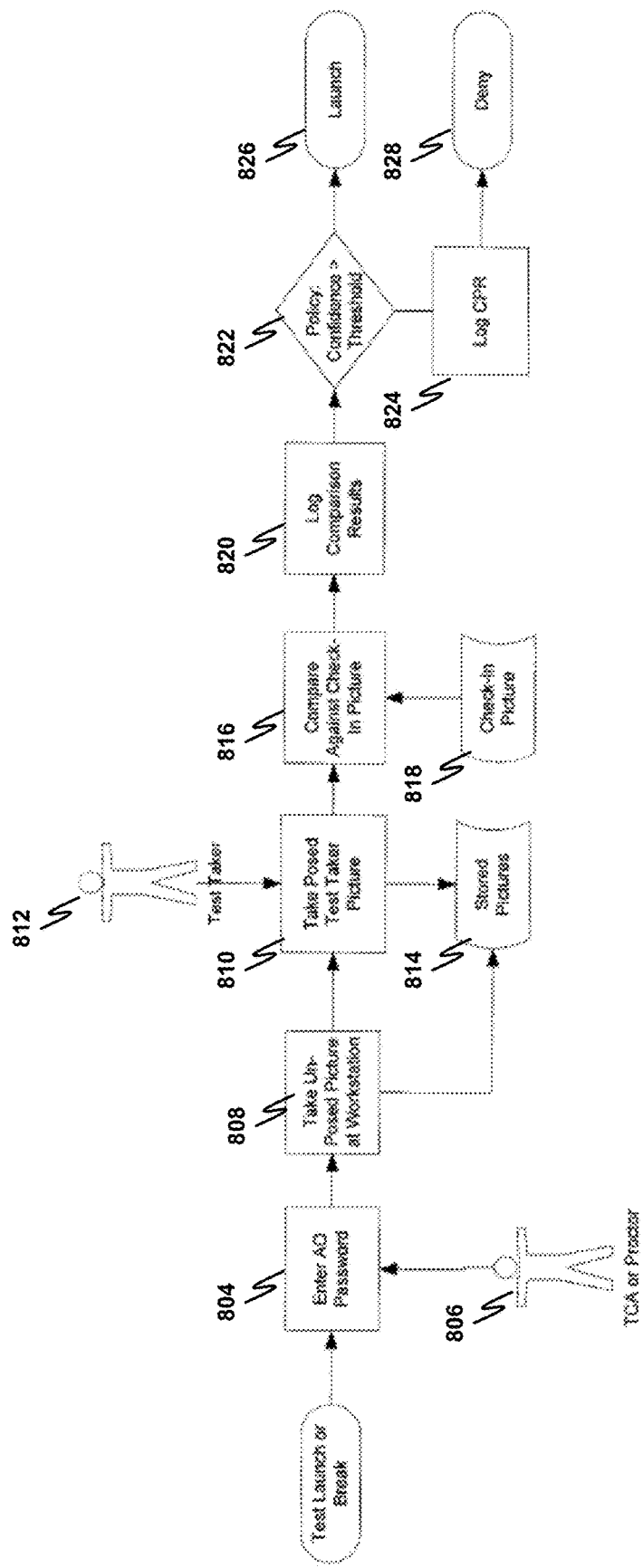
FIG. 8 is a flowchart depicting example steps for launching a test workstation at a testing center.

FIG. 8 is a flowchart depicting example steps for launching a test workstation at a testing center or initiating a break at a testing workstation (e.g., a break in which a test-taker 812 is allowed to leave the testing workstation and later return to the testing workstation to complete an examination). At 804, a TCA or proctor 806 is required to enter an administrator password (e.g., an AO password) at the testing workstation. At 808, an "un-posed" photograph of the test-taker 812 is taken. The photograph may be un-posed because the test-taker 812 may be unaware that the photograph is being taken (e.g., the test-taker 812 is not notified that the photograph is being taken, and the photograph is taken without visual or auditory notification). The un-posed photograph may be stored at 814 (e.g., within a database or datastore, etc.). At 810, a posed photograph of the test-taker 812 is taken and stored at 814.

At 816, the un-posed and/or posed photograph of the test-taker 812 is compared against a check-in photograph 818. For example, if the test-taker indicates that his name is "John Doe," the un-posed and/or posed photograph of the test-taker 812 is compared to the check-in photograph 818 associated with the name "John Doe." At 820, results of the comparison are logged. The results of the comparison may be used in modifying a confidence score associated with the test-taker 812, where the confidence score indicates a risk of fraud associated with the test-taker 812. For example, if the comparison yields a result of "true" (i.e., photograph captured at 808 and/or 810 matches check-in photograph 818), then the confidence score may be increased. Conversely, if the comparison yields a result of "false" (i.e., photograph captured at 808 and/or 810 does not match check-in photograph 818), then the confidence score may be decreased. At 822, a determination is made as to whether the confidence score meets or exceeds a threshold confidence score. Based on a determination that the confidence score meets or exceeds the threshold confidence score, at 826, the testing workstation is launched or the break is initiated. Based on a determination that the confidence score is less than the threshold confidence score, at 824, this result is logged in the CPR, and at 828, the requested action (e.g., launching the workstation or initiating the break) is denied.

Figure 9:
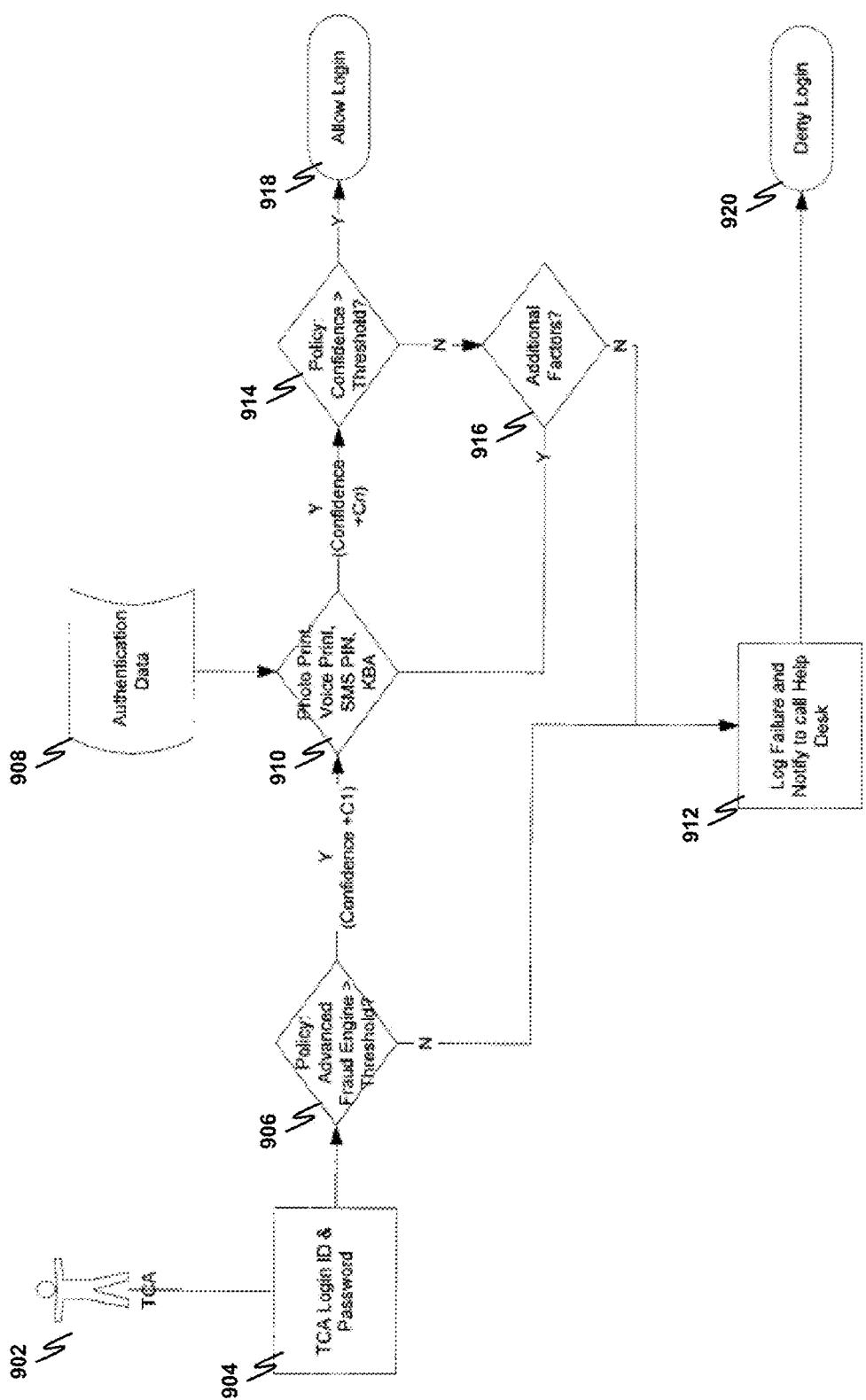
FIG. 9 is a flowchart depicting example steps for determining whether a TCA should be granted access to a website.

FIG. 9 is a flowchart depicting example steps for determining whether a TCA should be granted access to a website. In an example, the website is owned, operated, or maintained by the testing service or test provider. The website may be used, for example, in the administration of the computer-based examination or to store data related to the computer-based examination. At 904, a test center administrator (TCA) 902 provides his login ID and password. At 906, a determination is made as to whether a fraud score provided by an advanced fraud detection engine meets or exceeds a threshold fraud score. The advanced fraud detection engine may consider a variety of factors relating to the TCA 902 (e.g., bank account number of the TCA 902, credit score of the TCA 902, credit card number of the TCA 902, etc.) in determining the fraud score. If the fraud score is less than the threshold fraud score, at 912, this result is logged (e.g., in a center problem report). Additionally, at 912, the TCA 902 may be asked to call a help desk (e.g., a help desk of the testing service or examination provider). Subsequently, at 920, the TCA 902 is denied login to the website.

If the fraud score at 906 meets or exceeds the threshold fraud score, a confidence score is incremented (e.g., by an amount C1, as illustrated in the figure). Further, if the fraud score meets or exceeds the threshold fraud score, at 910, a determination is made as to whether biometric data of the TCA 902 matches expected biometric data for the TCA 902. The biometric data considered may include, for example, facial recognition data, voice recognition data, and fingerprint data, among other data. The authentication at 910 may further require the TCA 902 to provide a pin number received via a text message (e.g., a text-back pin), as described above. Data used in the authentication of step 910 (e.g., expected biometric data for the TCA, etc.) may be stored in an authentication data database 908 and may comprise data gathered during a certification procedure (e.g., a certification procedure by which the TCA 902 is authorized to participate in the administration of a computer-based examination).

If the biometric data of the TCA 902 matches the expected biometric data, the confidence score is incremented. At 914, a determination is made as to whether the confidence score meets or exceeds a threshold confidence score. If the confidence score meets or exceeds the threshold confidence score, the method proceeds to 918, and the TCA is permitted to login to the website. If the confidence score is less than the threshold confidence score, at 916, a determination is made as to whether additional factors (e.g., additional biometric factors, additional security factors, etc.) can be evaluated. If additional factors are available for evaluation, the method proceeds to 910, where such additional factors are evaluated. If additional factors are not available for evaluation, the method proceeds to 912 and 920, and these steps are performed as described above.

Figure 10:
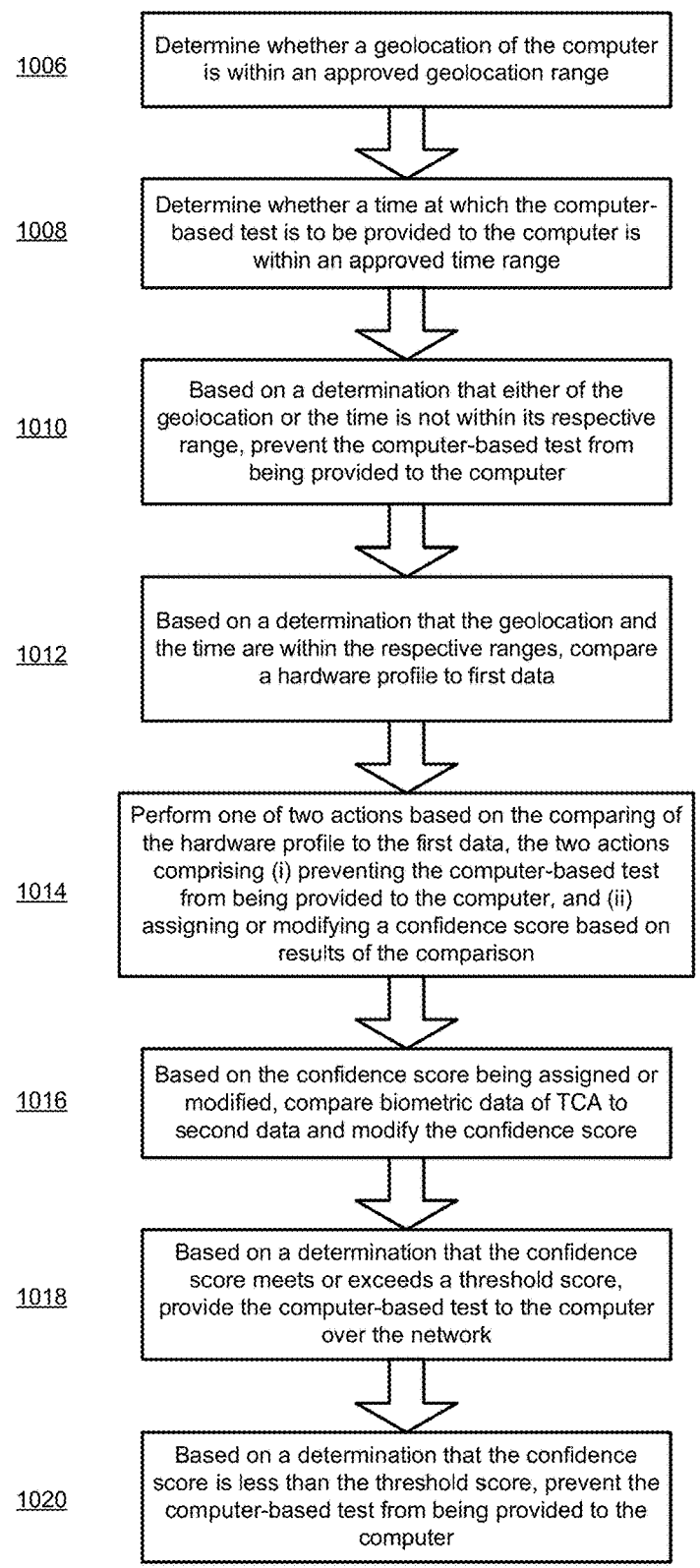
FIG. 10 is a flowchart depicting operations of an example computer-implemented method of providing via a network a computer-based test to be taken at a computer, the computer being located in a testing center.

FIG. 10 is a flowchart depicting operations of an example computer-implemented method of providing via a network a computer-based test to be taken at a computer, the computer being located in a testing center. At 1006, a determination is made as to whether a geolocation of the computer is within an approved geolocation range. At 1008, a determination is made as to whether a time at which the computer-based test is to be provided to the computer is within an approved time range. At 1010, based on a determination that either of the geolocation or the time is not within its respective range, the computer-based test is prevented from being provided to the computer. At 1012, based on a determination that the geolocation and the time are within the respective ranges, a hardware profile is compared to first data. The hardware profile comprises hardware configuration data for the computer and other computers located in the testing center, and the first data includes an expected hardware profile for the testing center. At 1014, one of two actions is selectively performed based on the comparing of the hardware profile to the first data, the two actions being (i) preventing the computer-based test from being provided to the computer, and (ii) assigning or modifying a confidence score based on results of the comparison. The confidence score indicates a risk of fraud associated with the testing center and a test center administrator. At 1016, based on the confidence score being assigned or modified, biometric data of the test center administrator is compared to second data, and the confidence score is modified based on results of the comparison. At 1018, based on a determination that the confidence score meets or exceeds a threshold score, the computer-based test is provided to the computer over the network. At 1020, based on a determination that the confidence score is less than the threshold score, the computer-based test is prevented from being provided to the computer.

Figure 11:
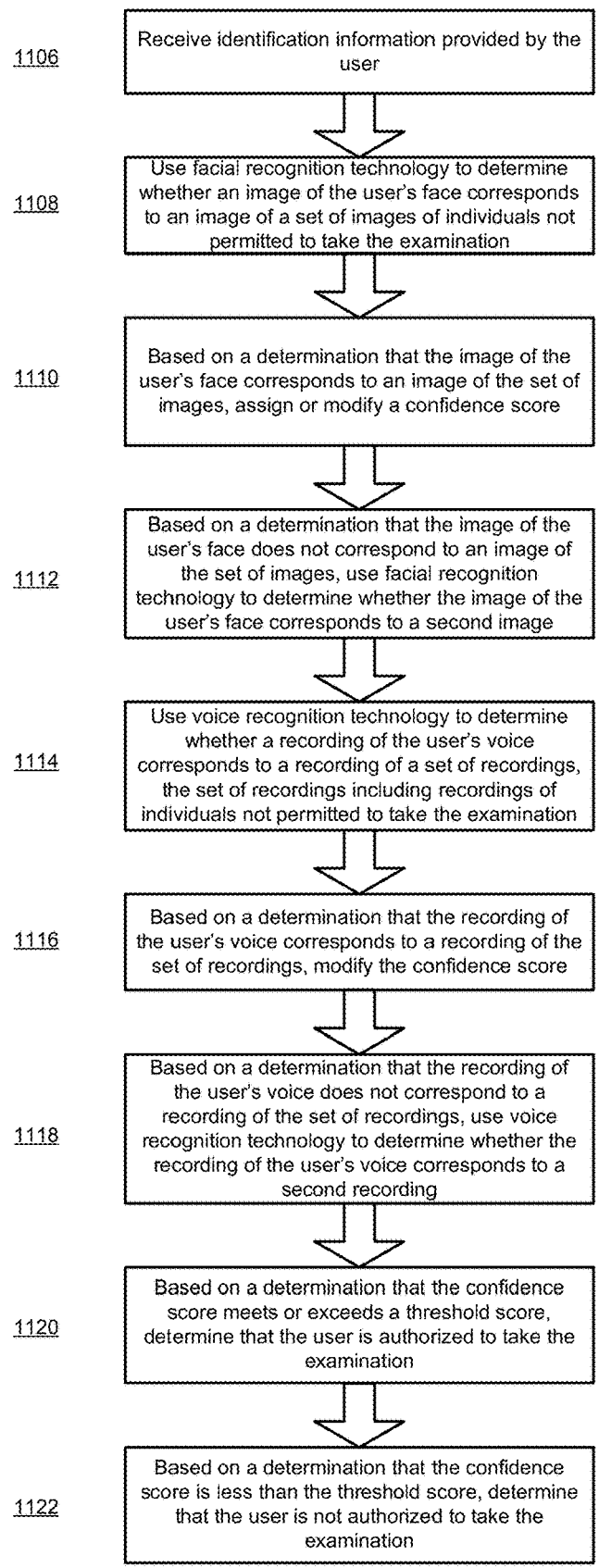
FIG. 11 is a flowchart depicting operations of an example computer-implemented method of determining whether a user is authorized to take an examination.

FIG. 11 is a flowchart depicting operations of an example computer-implemented method of determining whether a user is authorized to take an examination. At 1106, identification information provided by the user is received. At 1108, facial recognition technology is used to determine whether an image of the user's face corresponds to an image of a set of images of individuals not permitted to take the examination. At 1110, based on a determination that the image of the user's face corresponds to an image of the set of images, a confidence score is assigned or modified, the confidence score indicating a risk of fraud associated with the user. At 1112, based on a determination that the image of the user's face does not correspond to an image of the set of images, (i) facial recognition technology is used to determine whether the image of the user's face corresponds to a second image that is associated with the identification information, the second image having been captured during an examination registration, prior test administration, or other source, and (ii) the confidence score is modified based on the determination of whether the image of the user's face corresponds to the second image. At 1114, voice recognition technology is used to determine whether a recording of the user's voice corresponds to a recording of a set of recordings, the set of recordings including recordings of individuals not permitted to take the examination. At 1116, based on a determination that the recording of the user's voice corresponds to a recording of the set of recordings, the confidence score is modified. At 1118, based on a determination that the recording of the user's voice does not correspond to a recording of the set of recordings, (i) voice recognition technology is used to determine whether the recording of the user's voice corresponds to a second recording that is associated with the identification information, the second recording having been captured during the examination registration, the prior test administration, or the other source, and (ii) the confidence score is modified based on the determination of whether the recording of the user's voice corresponds to the second recording. At 1120, based on a determination that the confidence score meets or exceeds a threshold score, it is determined that the user is authorized to take the examination. At 1122, based on a determination that the confidence score is less than the threshold score, it is determined that the user is not authorized to take the examination.

Figure 12A:
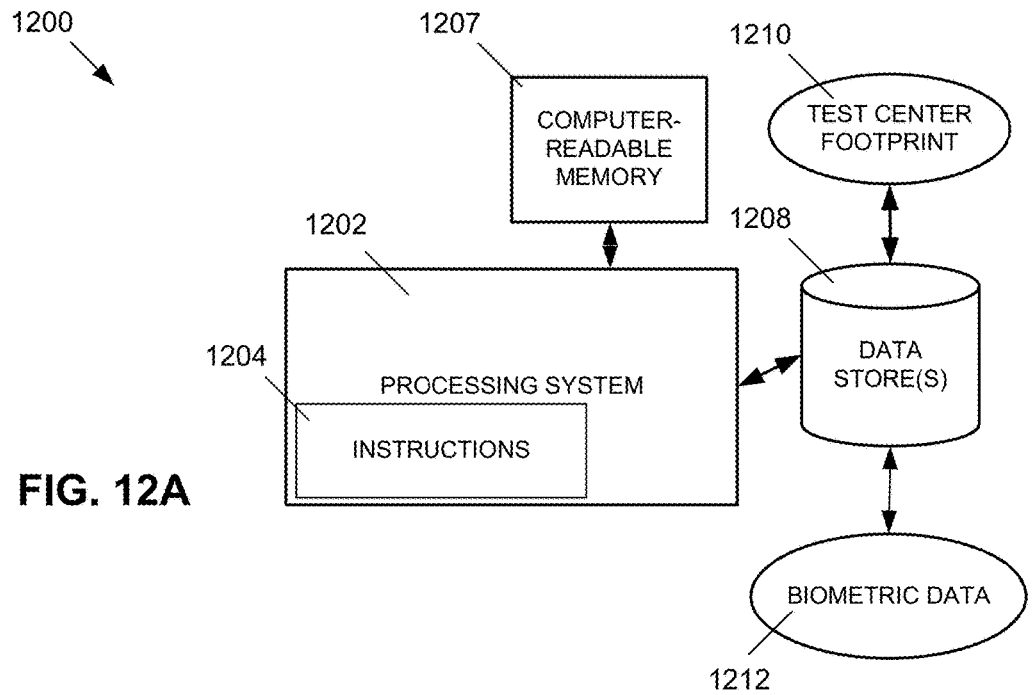
FIGS. 12A, 12B, and 12C depict example systems for multi-factor authentication for administration of a computer-based test.
Figure 12B:
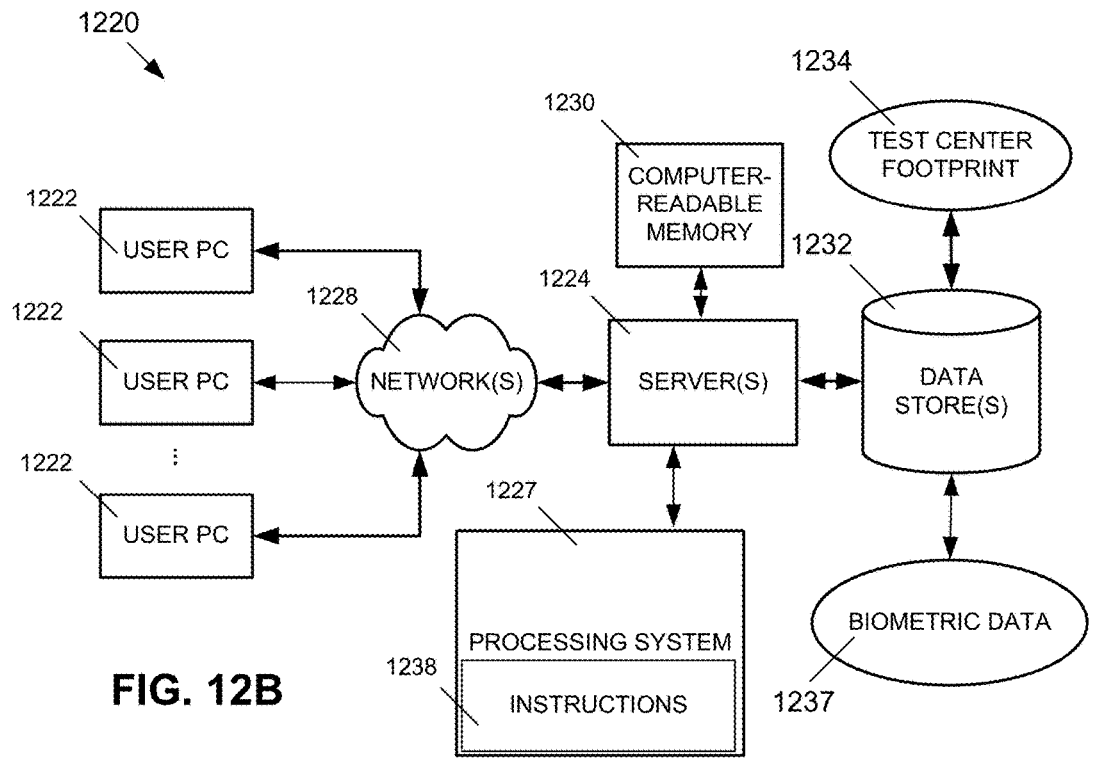
Figure 12C:
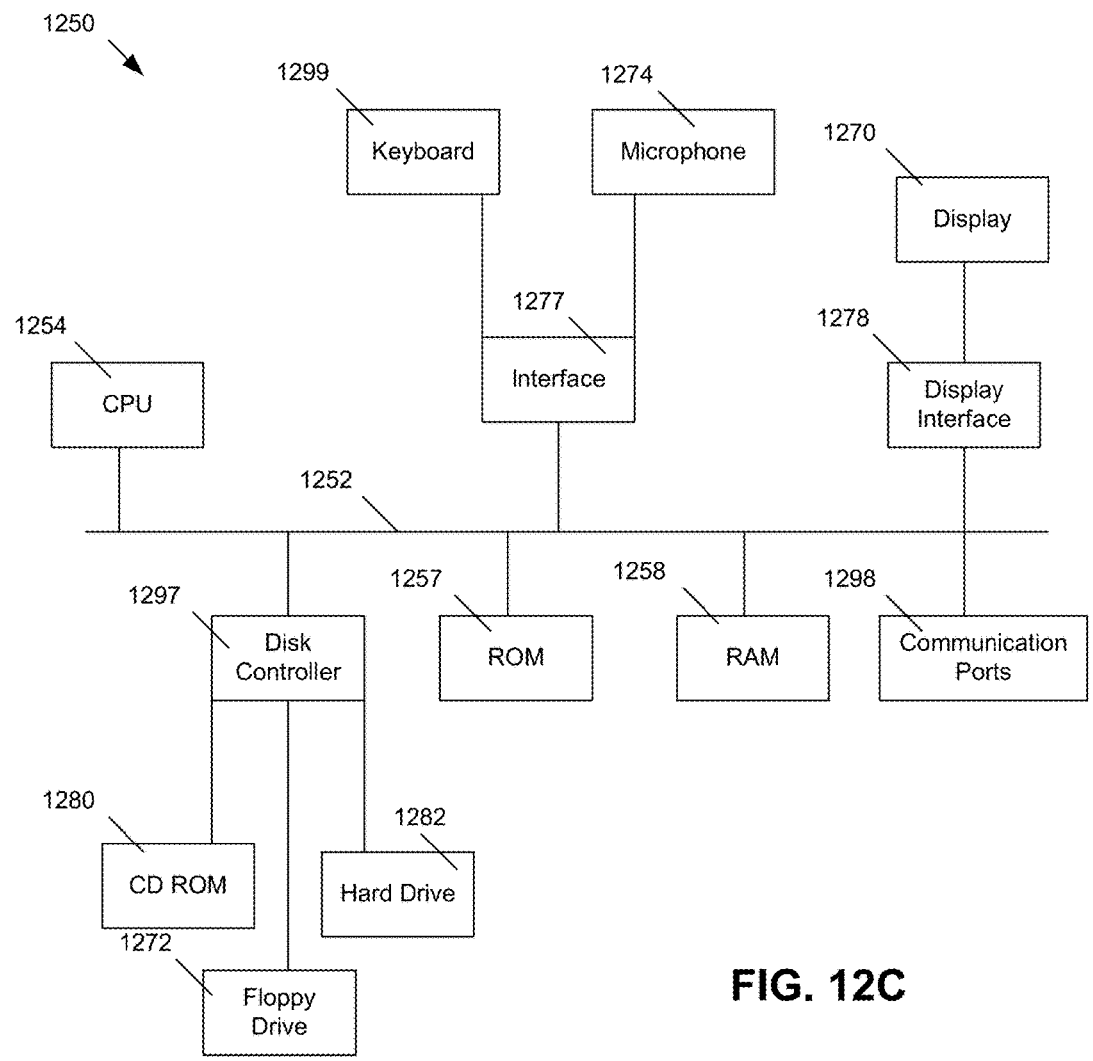

FIGS. 12A, 12B, and 12C depict example systems for multi-factor authentication for administration of a remote test administration. For example, FIG. 12A depicts an exemplary system 1200 that includes a standalone computer architecture where a processing system 1202 (e.g., one or more computer processors located in a given computer or in multiple computers that may be separate and distinct from one another) includes instructions 1204 for performing an authentication procedure. The processing system 1202 has access to a computer-readable memory 1207 in addition to one or more data stores 1208. The one or more data stores 1208 may include test center footprint data 1210 as well as biometric data 1212. The processing system 1202 may be a distributed parallel computing environment, which may be used to handle very large-scale data sets.

FIG. 12B depicts a system 1220 that includes a client-server architecture. One or more user PCs 1222 access one or more servers 1224 executing instructions 1238 for performing an authentication procedure on a processing system 1227 via one or more networks 1228. The one or more servers 1224 may access a computer-readable memory 1230 as well as one or more data stores 1232. The one or more data stores 1232 may contain test center footprint data 1234 as well as biometric data 1237.

FIG. 12C shows a block diagram of exemplary hardware for a standalone computer architecture 1250, such as the architecture depicted in FIG. 12A that may be used to contain and/or implement the program instructions of system embodiments of the present disclosure. A bus 1252 may serve as the information highway interconnecting the other illustrated components of the hardware. A processing system 1254 labeled CPU (central processing unit) (e.g., one or more computer processors at a given computer or at multiple computers), may perform calculations and logic operations required to execute a program. A non-transitory processor-readable storage medium, such as read only memory (ROM) 1257 and random access memory (RAM) 1258, may be in communication with the processing system 1254 and may contain one or more programming instructions for performing the method for multi-factor authentication for administration of a remote test administration. Optionally, program instructions may be stored on a non-transitory computer-readable storage medium such as a magnetic disk, optical disk, recordable memory device, flash memory, or other physical storage medium.

In FIGS. 12A, 12B, and 12C, computer readable memories 1207, 1230, 1257, 1258 or data stores 1208, 1232, 1257, 1258, 1272, 1280, 1282 may include one or more data structures for storing and associating various data used in the example systems for multi-factor authentication for administration of a remote test administration. For example, a data structure stored in any of the aforementioned locations may be used to associate test-taker biometric data, as captured during registration, and test-taker biometric data, as captured at a check-in procedure prior to a test administration. Other aspects of the example systems for multi-factor authentication for administration of a remote test administration may be stored and associated in the one or more data structures.

A disk controller 1297 interfaces one or more optional disk drives to the system bus 1252. These disk drives may be external or internal floppy disk drives such as 1272, external or internal CD-ROM, CD-R, CD-RW or DVD drives such as 1280, or external or internal hard drives 1282. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1297, the ROM 1257 and/or the RAM 1258. The processor 1254 may access one or more components as required.

A display interface 1278 may permit information from the bus 1252 to be displayed on a display 1270 in audio, graphic, or alphanumeric format. Communication with external devices may optionally occur using various communication ports 1298.

In addition to these computer-type components, the hardware may also include data input devices, such as a keyboard 1299, or other input device 1274, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computerized approaches described herein for multifactor verification to thwart fraud associated with computer-based tests are very different from conventional human verifications associated with test taking. In conventional human verifications associated with test taking, an administrator may examine a government issued identification for the test taker and inspect a ticket presented by the test taker that was issued by the testing authority. In contrast, the approaches described herein not only authenticate the test taker with a collection of biometric data, such as voice, fingerprint and photograph data, but also authenticate the test administrators (test administrators and proctors) using such biometric data. Moreover, unlike conventional verifications, the approaches described herein authenticate the computer hardware used in the test (e.g., based on computer-determined hardware and software profiles) and ensure that the test is being administered at an approved geolocation (e.g., based on a computer-determined geolocation, such as via GPS or computer server IP address) and at an approved time (e.g., based on a computer-determined time-stamp). Additional distinctions between the approaches described herein and conventional human verification are described throughout this disclosure. The approaches described herein are rooted in computer technology and are vastly different than conventional verification carried out by human assessment as noted above. Accordingly, it is evident that the approaches described herein are not mere computer implementation of conventional human verification and indeed are vastly different from such.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A computer-implemented method of determining whether a user is authorized to take an examination at a computer, the method comprising:
    performing a first verification process to determine whether a geolocation of the computer is within an approved geolocation range;
    performing a second verification process to determine whether a time at which the examination is to be provided to the computer is within an approved time range, the first and second verification processes utilizing computer-based techniques for determining and reporting the geolocation and time to a verification entity that do not rely on information reported by the user;
    based on a determination that either of the geolocation or the time is not within its respective range, preventing the user from taking the examination at the computer;
    based on a determination that the geolocation and the time are within the respective ranges:
    receiving identification information provided by the user;
    using facial recognition technology to determine whether an image of the user's face corresponds to an image of a set of images, the set of images including images of individuals other than the user that are not permitted to take the examination;
    based on a determination that the image of the user's face corresponds to an image of the set of images, assigning or modifying a confidence score, the confidence score indicating a risk of fraud associated with the user;
    based on a determination that the image of the user's face does not correspond to an image of the set of images, (i) using facial recognition technology to determine whether the image of the user's face corresponds to a second image that is associated with the identification information, the second image having been captured during an examination registration, and (ii) modifying the confidence score based on the determination of whether the image of the user's face corresponds to the second image;
    using voice recognition technology to determine whether a recording of the user's voice corresponds to a recording of a set of recordings, the set of recordings including recordings of individuals not permitted to take the examination;
    based on a determination that the recording of the user's voice corresponds to a recording of the set of recordings, modifying the confidence score;
    based on a determination that the recording of the user's voice does not correspond to a recording of the set of recordings, (i) using voice recognition technology to determine whether the recording of the user's voice corresponds to a second recording that is associated with the identification information, the second recording having been captured during the examination registration, and (ii) modifying the confidence score based on the determination of whether the recording of the user's voice corresponds to the second recording; and
    based on a determination that the confidence score meets or exceeds a threshold score, determining that the user is authorized to take the examination; and
    based on a determination that the confidence score is less than the threshold score, determining that the user is not authorized to take the examination.

2. The computer-implemented method of claim 1, wherein the identification information includes at least one of a name, address, social security number, and date of birth.

3. The computer-implemented method of claim 1,
    wherein the modifying of the confidence score based on the determination that the image of the user's face corresponds to the image of the set of images comprises decreasing the confidence score; and
    wherein the modifying of the confidence score based on the determination that the recording of the user's voice corresponds to the recording of the set of recordings comprises decreasing the confidence score.

4. The computer-implemented method of claim 1, wherein the confidence score is increased based on a determination that the image of the user's face corresponds to the second image, wherein the confidence score is decreased based on a determination that the image of the user's face does not correspond to the second image, wherein the confidence score is increased based on a determination that the recording of the user's voice corresponds to the second recording, and wherein the confidence score is decreased based on a determination that the recording of the user's voice does not correspond to the second recording.

5. The computer-implemented method of claim 1 comprising generating a fraud alert based on a determination that:
    the image of the user's face corresponds to the image of the set of images;
    the image of the user's face does not correspond to the second image;

the recording of the user's voice corresponds to the recording of the set of recordings; or the recording of the user's voice does not correspond to the second recording.

6. The computer-implemented method of claim 1 comprising:

receiving additional biometric data from the user; and using a computer-based process to determine whether the additional biometric data corresponds to biometric data of a rogue gallery, the rogue gallery including data for individuals known to have perpetrated test-related fraud.

7. The computer-implemented method of claim 6, wherein the additional biometric data comprises fingerprint data.

8. A system for determining whether a user is authorized to take an examination, the system comprising:

one or more processing systems; and one or more non-transitory computer-readable storage mediums in communication with the one or more processing systems and encoded with instructions for commanding the one or more processing systems to execute steps comprising:

performing a first verification process to determine whether a geolocation of the computer is within an approved geolocation range;

performing a second verification process to determine whether a time at which the examination is to be provided to the computer is within an approved time range, the first and second verification processes utilizing computer-based techniques for determining and reporting the geolocation and time to a verification entity that do not rely on information reported by the user;

based on a determination that either of the geolocation or the time is not within its respective range, preventing the user from taking the examination at the computer;

based on a determination that the geolocation and the time are within the respective ranges:

receiving identification information provided by the user;

using facial recognition technology to determine whether an image of the user's face corresponds to an image of a set of images, the set of images including images of individuals other than the user that are not permitted to take the examination;

based on a determination that the image of the user's face corresponds to an image of the set of images, assigning or modifying a confidence score, the confidence score indicating a risk of fraud associated with the user;

based on a determination that the image of the user's face does not correspond to an image of the set of images, (i) using facial recognition technology to determine whether the image of the user's face corresponds to a second image that is associated with the identification information, the second image having been captured during an examination registration, and (ii) modifying the confidence score based on the determination of whether the image of the user's face corresponds to the second image;

using voice recognition technology to determine whether a recording of the user's voice corresponds to a recording of a set of recordings, the set of recordings including recordings of individuals not permitted to take the examination;

based on a determination that the recording of the user's voice corresponds to a recording of the set of recordings, modifying the confidence score;

based on a determination that the recording of the user's voice does not correspond to a recording of the set of recordings, (i) using voice recognition technology to determine whether the recording of the user's voice corresponds to a second recording that is associated with the identification information, the second recording having been captured during the examination registration, and (ii) modifying the confidence score based on the determination of whether the recording of the user's voice corresponds to the second recording; and based on a determination that the confidence score meets or exceeds a threshold score, determining that the user is authorized to take the examination; and based on a determination that the confidence score is less than the threshold score, determining that the user is not authorized to take the examination.

9. The system of claim 8, wherein the identification information includes at least one of a name, address, social security number, and date of birth.

10. The system of claim 8, wherein the modifying of the confidence score based on the determination that the image of the user's face corresponds to the image of the set of images comprises decreasing the confidence score; and wherein the modifying of the confidence score based on the determination that the recording of the user's voice corresponds to the recording of the set of recordings comprises decreasing the confidence score.

11. The system of claim 8, wherein the confidence score is increased based on a determination that the image of the user's face corresponds to the second image, wherein the confidence score is decreased based on a determination that the image of the user's face does not correspond to the second image, wherein the confidence score is increased based on a determination that the recording of the user's voice corresponds to the second recording, and wherein the confidence score is decreased based on a determination that the recording of the user's voice does not correspond to the second recording.

12. The system of claim 8, wherein the instructions further command the one or more processing systems to generate a fraud alert based on a determination that:

the image of the user's face corresponds to the image of the set of images;

the image of the user's face does not correspond to the second image;

the recording of the user's voice corresponds to the recording of the set of recordings; or the recording of the user's voice does not correspond to the second recording.

13. The system of claim 8, wherein the steps comprise:

receiving additional biometric data from the user; and using a computer-based process to determine whether the additional biometric data corresponds to biometric data of a rogue gallery, the rogue gallery including data for individuals known to have perpetrated test-related fraud.

14. The system of claim 13, wherein the additional biometric data comprises fingerprint data.

15. A non-transitory computer-readable storage medium for determining whether a user is authorized to take an examination, the computer-readable storage medium comprising computer executable instructions which, when executed, cause a processing system to execute steps including:

performing a first verification process to determine whether a geolocation of the computer is within an approved geolocation range;
performing a second verification process to determine whether a time at which the examination is to be provided to the computer is within an approved time range, the first and second verification processes utilizing computer-based techniques for determining and reporting the geolocation and time to a verification entity that do not rely on information reported by the user;
based on a determination that either of the geolocation or the time is not within its respective range, preventing the user from taking the examination at the computer;
based on a determination that the geolocation and the time are within the respective ranges:
receiving identification information provided by the user;
using facial recognition technology to determine whether an image of the user's face corresponds to an image of a set of images, the set of images including images of individuals other than the user that are not permitted to take the examination;
based on a determination that the image of the user's face corresponds to an image of the set of images, assigning or modifying a confidence score, the confidence score indicating a risk of fraud associated with the user;
based on a determination that the image of the user's face does not correspond to an image of the set of images, (i) using facial recognition technology to determine whether the image of the user's face corresponds to a second image that is associated with the identification information, the second image having been captured during an examination registration, and (ii) modifying the confidence score based on the determination of whether the image of the user's face corresponds to the second image;
using voice recognition technology to determine whether a recording of the user's voice corresponds to a recording of a set of recordings, the set of recordings including recordings of individuals not permitted to take the examination;
based on a determination that the recording of the user's voice corresponds to a recording of the set of recordings, modifying the confidence score;
based on a determination that the recording of the user's voice does not correspond to a recording of the set of recordings, (i) using voice recognition technology to determine whether the recording of the user's voice corresponds to a second recording that is associated with the identification information, the second recording having been captured during the examination registration, and (ii) modifying the confidence score based on the determination of whether the recording of the user's voice corresponds to the second recording; and
based on a determination that the confidence score meets or exceeds a threshold score, determining that the user is authorized to take the examination; and
based on a determination that the confidence score is less than the threshold score, determining that the user is not authorized to take the examination.

16. The non-transitory computer-readable storage medium of claim 15, wherein the identification information includes at least one of a name, address, social security number, and date of birth.

17. The non-transitory computer-readable storage medium of claim 15,
wherein the modifying of the confidence score based on the determination that the image of the user's face corresponds to the image of the set of images comprises decreasing the confidence score; and
wherein the modifying of the confidence score based on the determination that the recording of the user's voice corresponds to the recording of the set of recordings comprises decreasing the confidence score.

18. The non-transitory computer-readable storage medium of claim 15, wherein the confidence score is increased based on a determination that the image of the user's face corresponds to the second image, wherein the confidence score is decreased based on a determination that the image of the user's face does not correspond to the second image, wherein the confidence score is increased based on a determination that the recording of the user's voice corresponds to the second recording, and wherein the confidence score is decreased based on a determination that the recording of the user's voice does not correspond to the second recording.

19. The non-transitory computer-readable storage medium of claim 15, wherein the steps comprise generating a fraud alert based on a determination that:
the image of the user's face corresponds to the image of the set of images;
the image of the user's face does not correspond to the second image;
the recording of the user's voice corresponds to the recording of the set of recordings; or
the recording of the user's voice does not correspond to the second recording.

20. The non-transitory computer-readable storage medium of claim 15, wherein the steps comprise:
receiving additional biometric data from the user; and
using a computer-based process to determine whether the additional biometric data corresponds to biometric data of a rogue gallery, the rogue gallery including data for individuals known to have perpetrated test-related fraud.

* * * * *